(12) United States Patent
Kim et al.

(10) Patent No.: US 12,556,263 B2
(45) Date of Patent: Feb. 17, 2026

(54) METHOD FOR TRANSMITTING AND RECEIVING SIGNAL FOR BEAM SEARCH IN WIRELESS COMMUNICATION SYSTEM, AND APPARATUS THEREFOR

(71) Applicant: LG ELECTRONICS INC., Seoul (KR)

(72) Inventors: Sunam Kim, Seoul (KR); Sungho Park, Seoul (KR); Minseog Kim, Seoul (KR); Jaehwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 338 days.

(21) Appl. No.: 18/027,783

(22) PCT Filed: Sep. 25, 2020

(86) PCT No.: PCT/KR2020/013086
§ 371 (c)(1),
(2) Date: Mar. 22, 2023

(87) PCT Pub. No.: WO2022/065553
PCT Pub. Date: Mar. 31, 2022

(65) Prior Publication Data
US 2023/0344505 A1 Oct. 26, 2023

(51) Int. Cl.
*H04B 7/08* (2006.01)
*H04W 56/00* (2009.01)
(52) U.S. Cl.
CPC ........ *H04B 7/088* (2013.01); *H04W 56/0015* (2013.01)

(58) Field of Classification Search
CPC .. H04B 7/088; H04B 7/0408; H04B 7/06952; H04B 7/0617; H04B 7/0695; H04B 10/90; H04W 56/0015; H04W 16/28; H04W 72/04; H04W 72/0446
See application file for complete search history.

(56) References Cited

U.S. PATENT DOCUMENTS

| | | | |
|---|---|---|---|
| 2018/0159607 A1 | 6/2018 | Rybakowski et al. | |
| 2020/0028556 A1 | 1/2020 | Inoue et al. | |
| 2020/0288421 A1 | 9/2020 | Kim et al. | |
| 2021/0259040 A1* | 8/2021 | Babaei | H04W 72/23 |

(Continued)

FOREIGN PATENT DOCUMENTS

| | | | |
|---|---|---|---|
| JP | 2018142925 | * | 9/2018 |
| JP | 2018148409 A | | 9/2018 |

(Continued)

*Primary Examiner* — Mewale A Ambaye
(74) *Attorney, Agent, or Firm* — BRYAN CAVE LEIGHTON PAISNER LLP

(57) ABSTRACT

A method for receiving, by a terminal, a signal for a beam search in a wireless communication system, according to an embodiment of the present specification, includes the steps of: receiving a beam search signal (BSS); determining a reception beam (Rx beam) on the basis of the BSS; and receiving a downlink signal on the basis of the Rx beam, wherein the BSS is transmitted on the basis of a specific port that is different from a port related to the transmission of the downlink signal, and the BSS is transmitted on the basis of at least one antenna array configured exclusively for the specific port from among a plurality of antenna arrays.

11 Claims, 27 Drawing Sheets

(56) References Cited

U.S. PATENT DOCUMENTS

| | | | |
|---|---|---|---|
| 2022/0109528 A1* | 4/2022 | Babaei | H04W 72/04 |
| 2022/0278880 A1* | 9/2022 | Matsumura | H04J 13/004 |
| 2022/0279360 A1* | 9/2022 | Matsumura | H04L 5/0017 |
| 2024/0147433 A1* | 5/2024 | Zhang | H04L 5/14 |
| 2024/0195523 A1* | 6/2024 | Elshafie | H04W 72/0446 |
| 2024/0204871 A1* | 6/2024 | Landis | H04B 7/155 |

FOREIGN PATENT DOCUMENTS

| | | |
|---|---|---|
| KR | 10-2018-0129954 A | 12/2015 |
| KR | 10-2018-0089901 A | 8/2018 |
| KR | 1020200050309 | 5/2020 |

* cited by examiner

[FIG. 1]
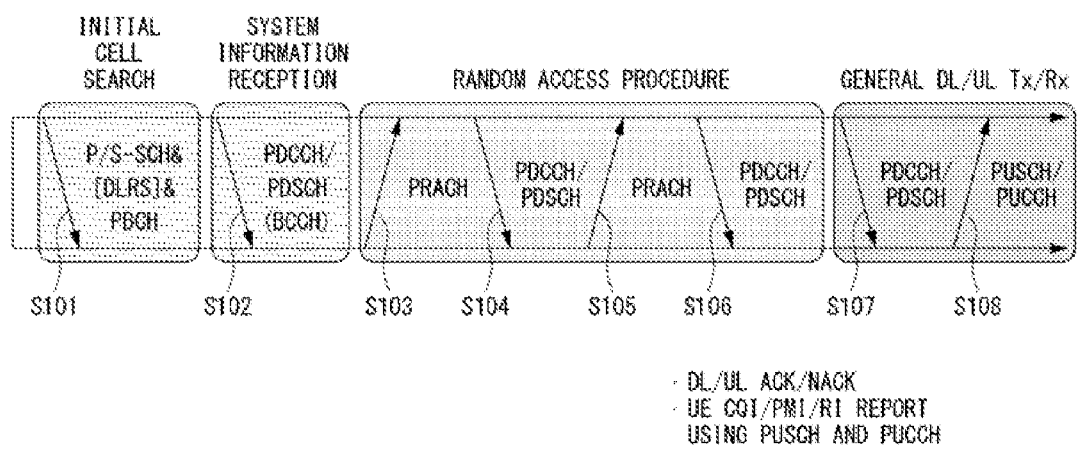

[FIG. 2]
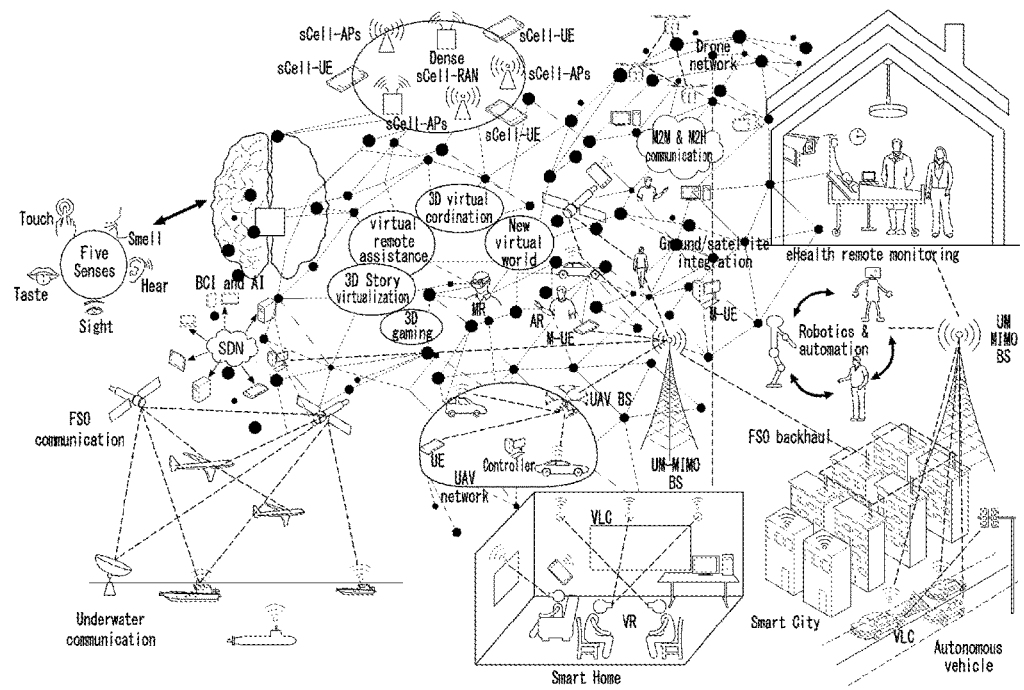

[FIG. 3]
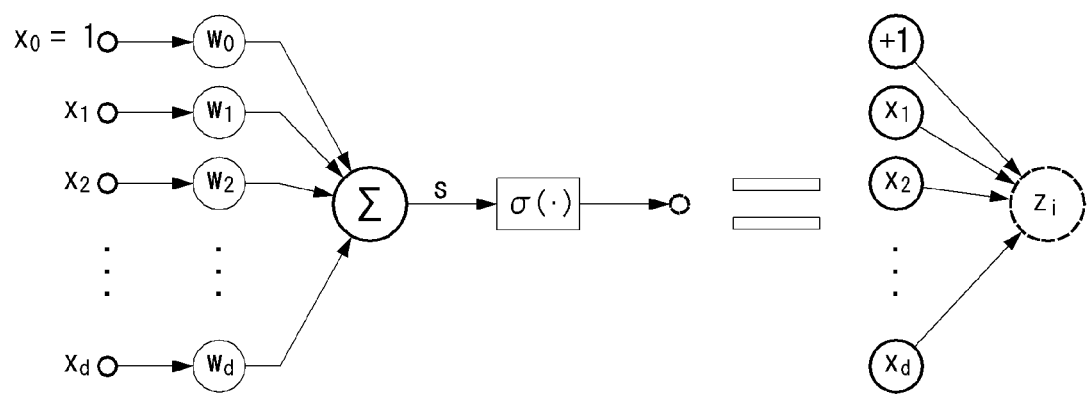

[FIG. 4]
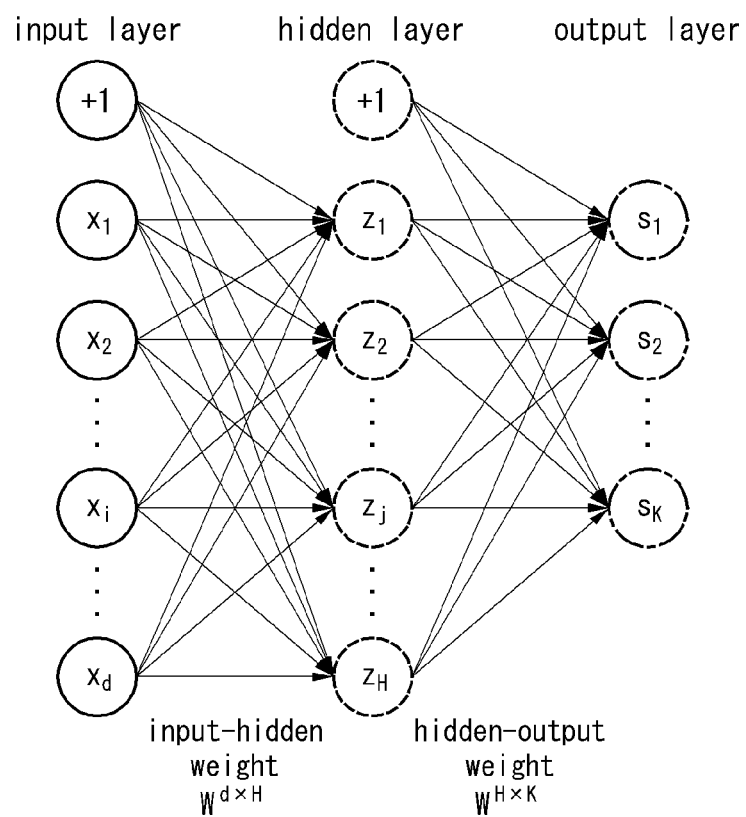

[FIG. 5]
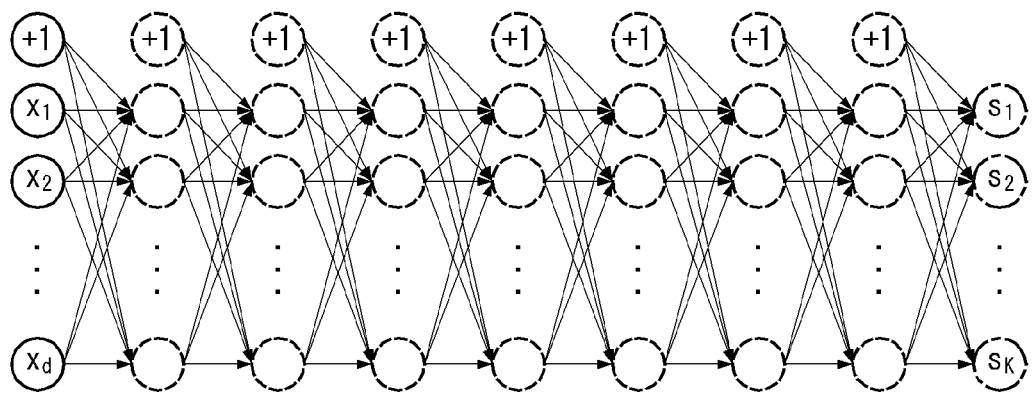

[FIG. 6]
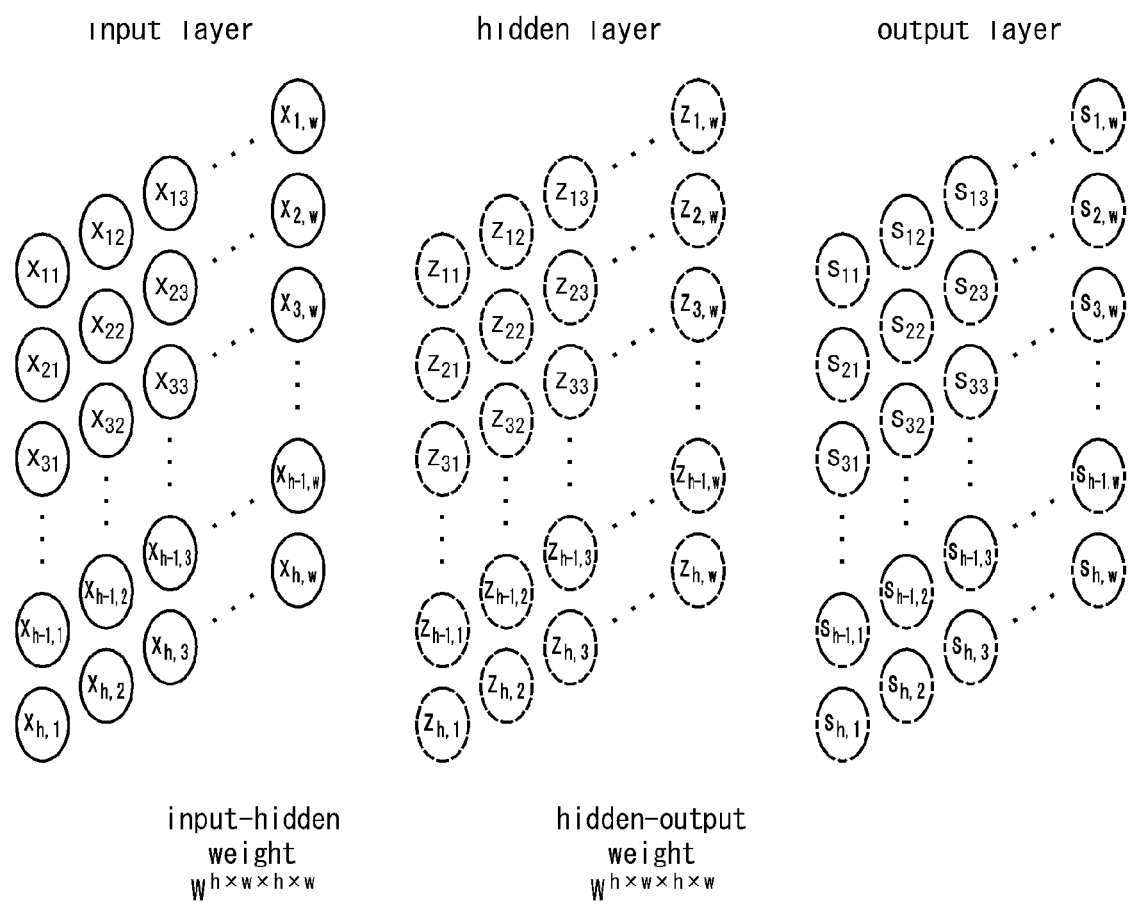

[FIG. 7]
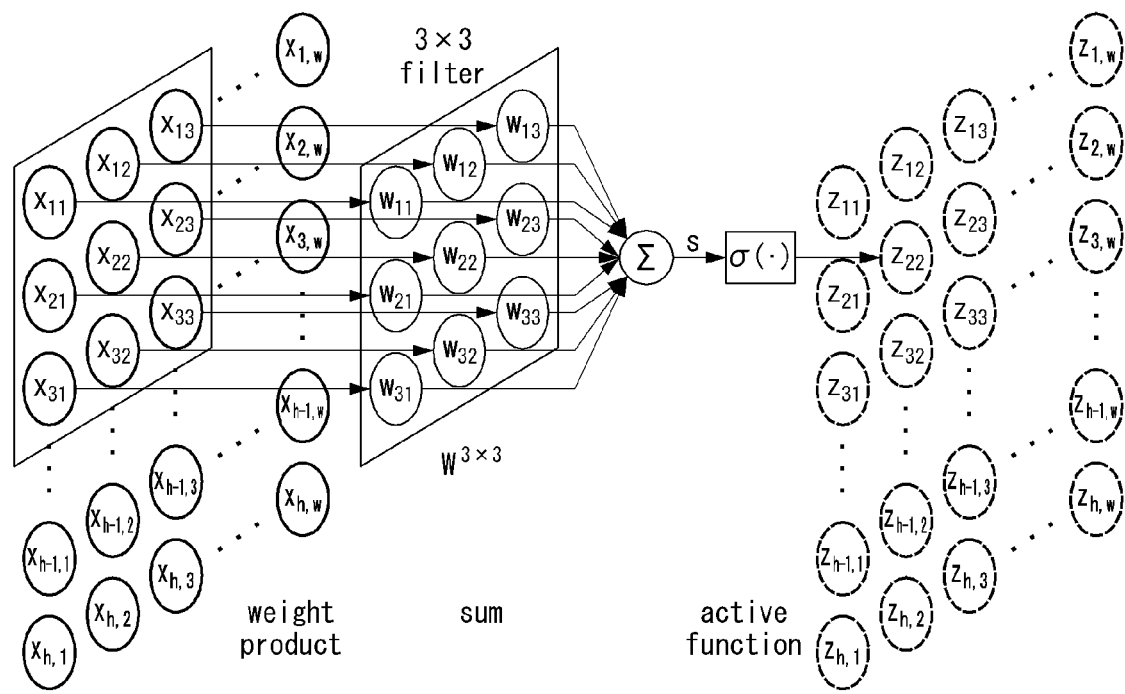

[FIG. 8]
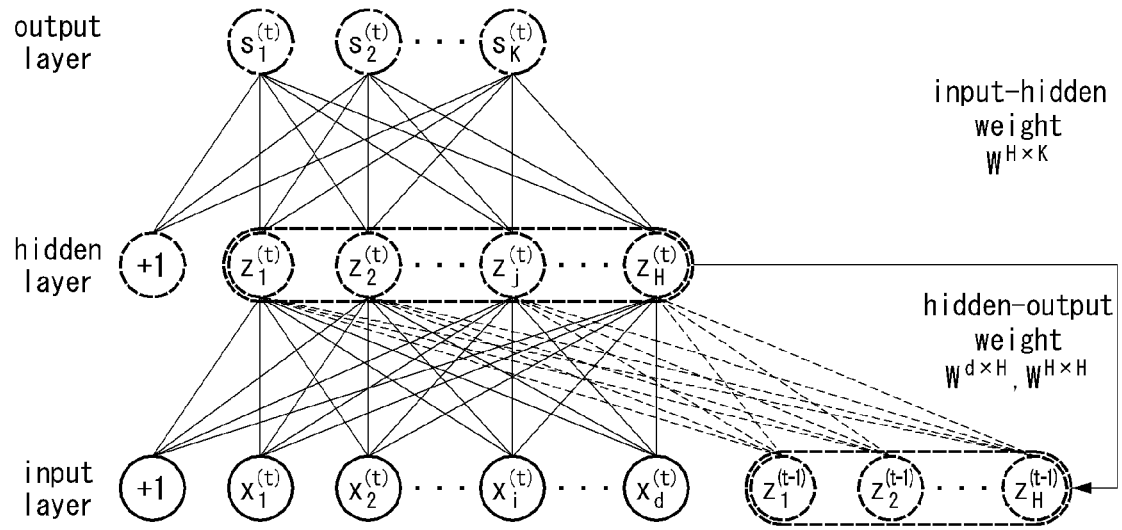

[FIG. 9]
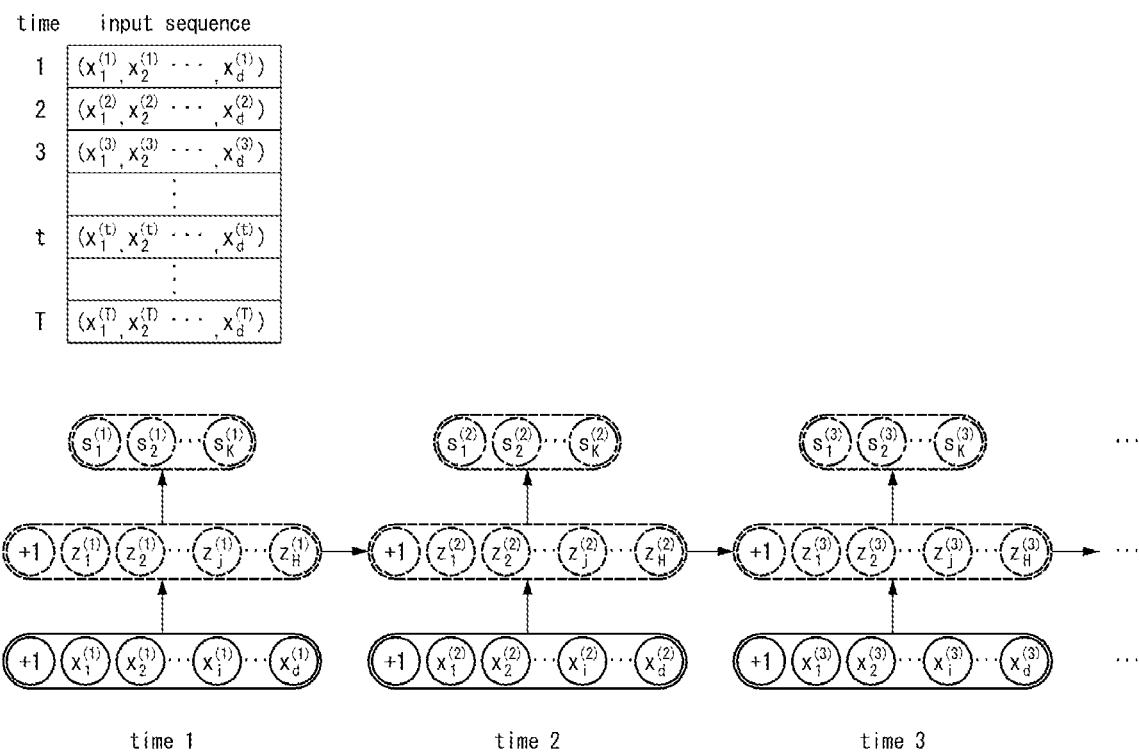

[FIG. 10]
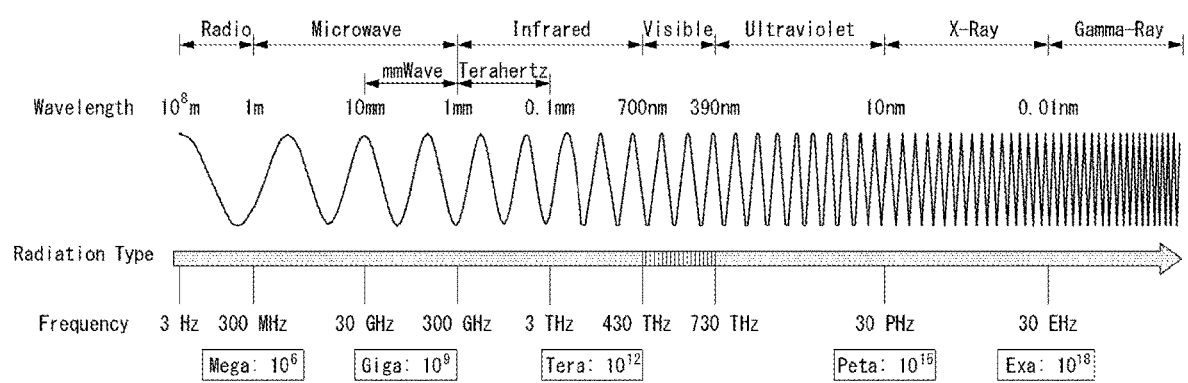

[FIG. 11]
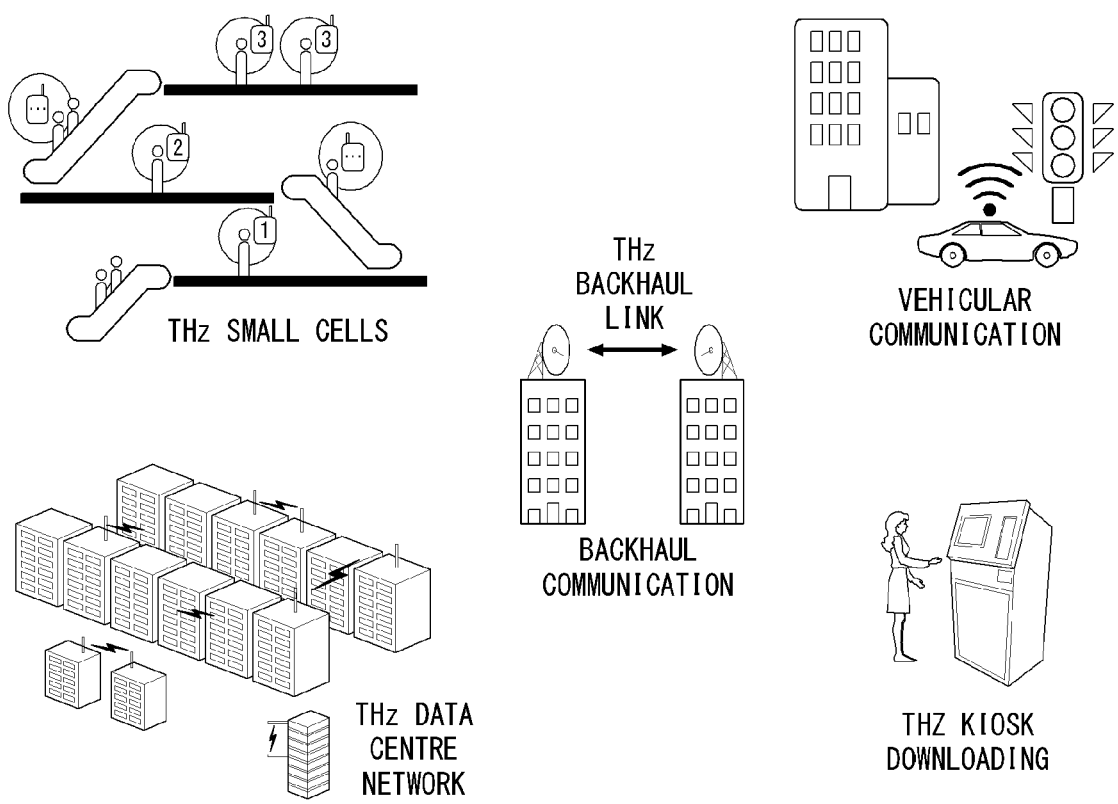

[FIG. 12]
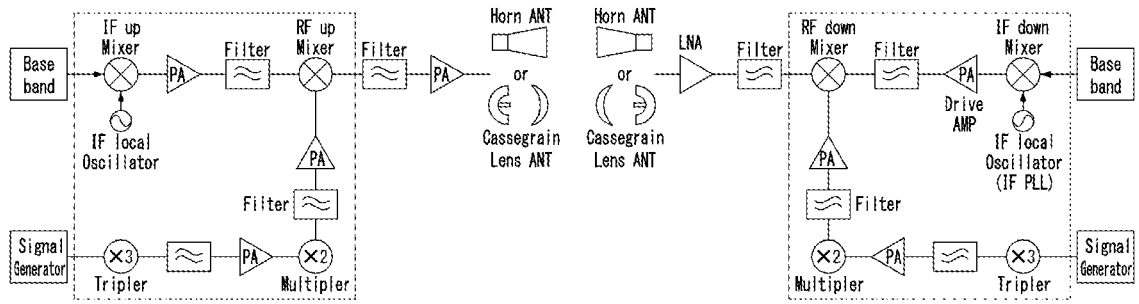
[FIG. 13]
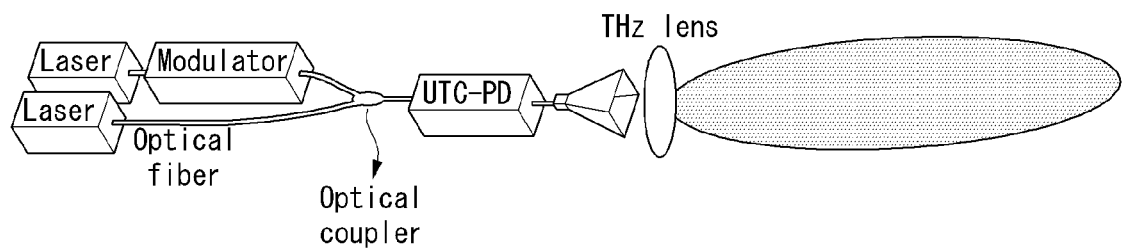

[FIG. 14]
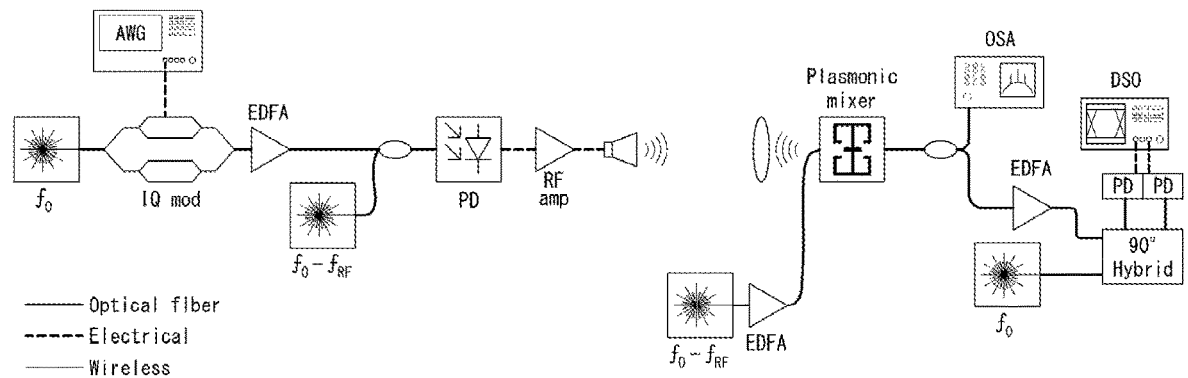

[FIG. 15]
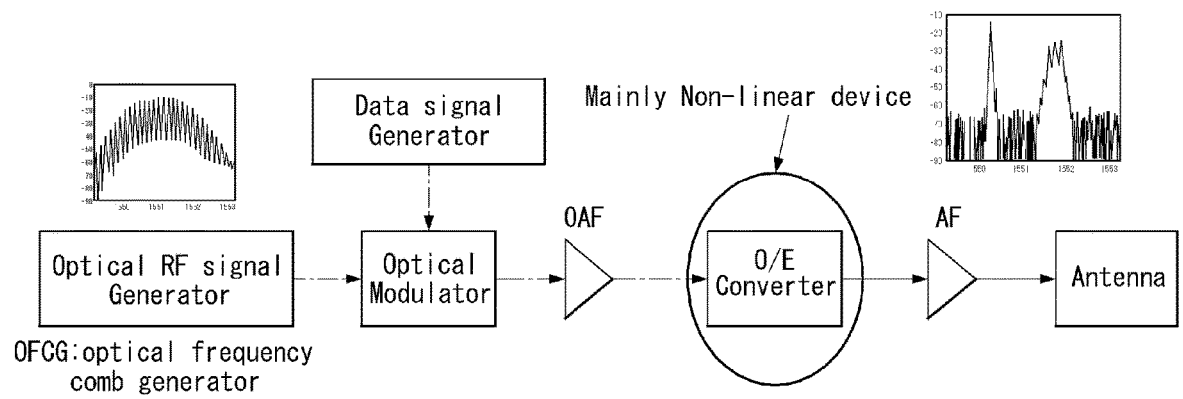

[FIG. 16]
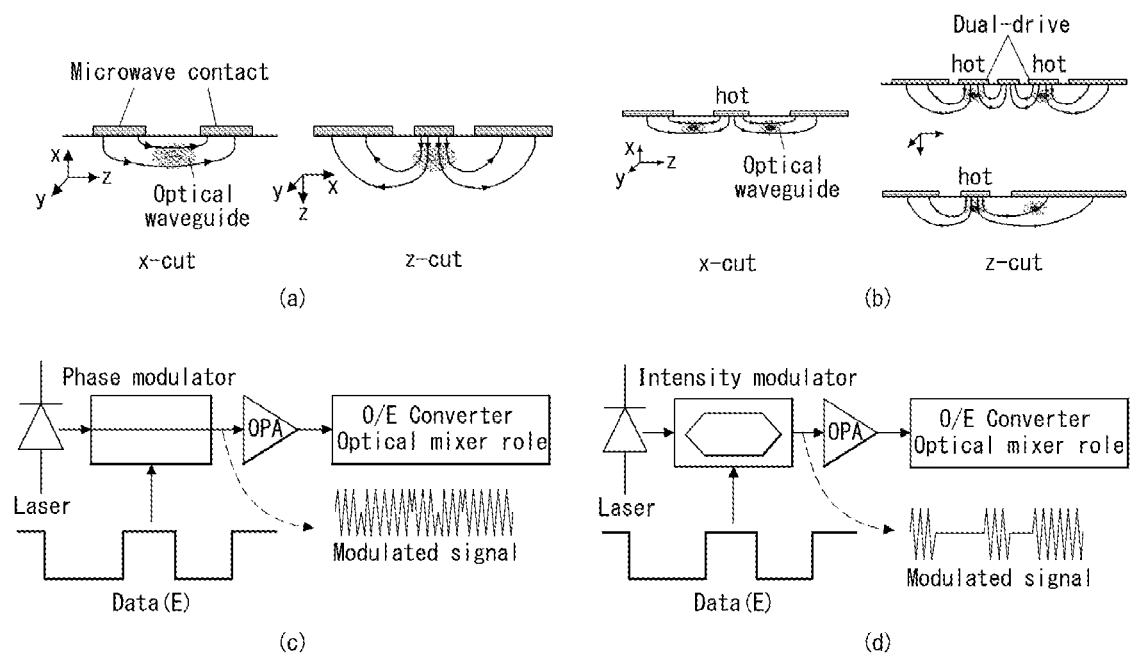

[FIG. 17]
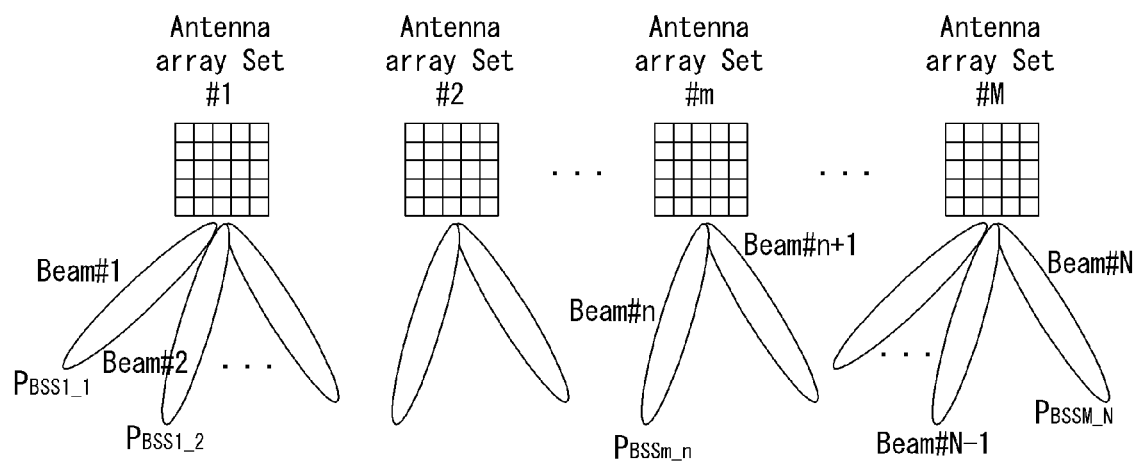

[FIG. 18]
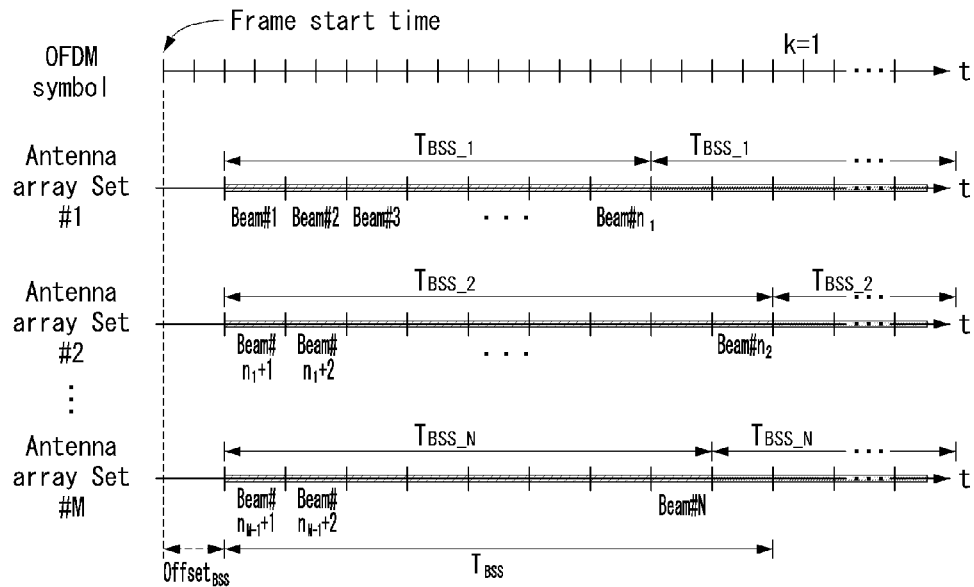
(a)
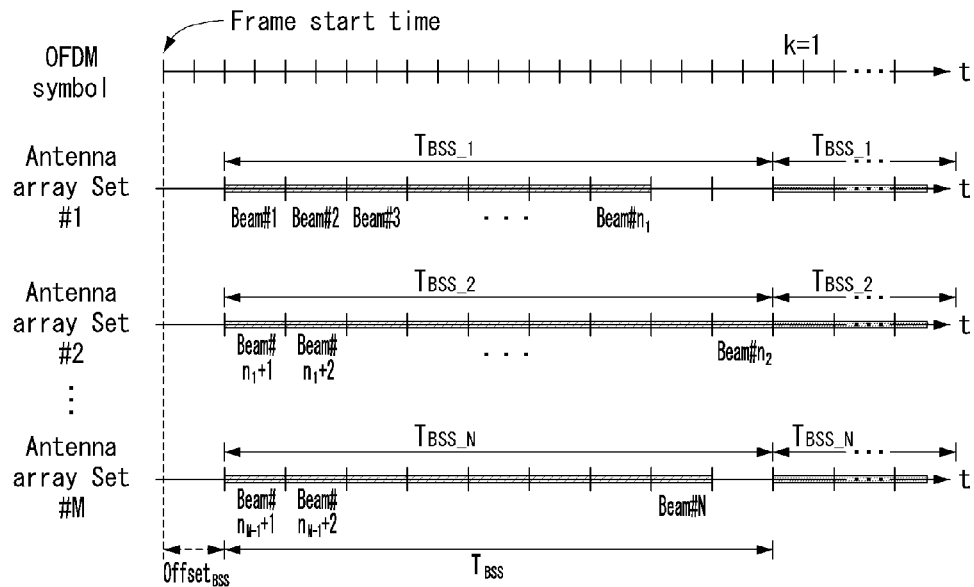
(b)

[FIG. 19]
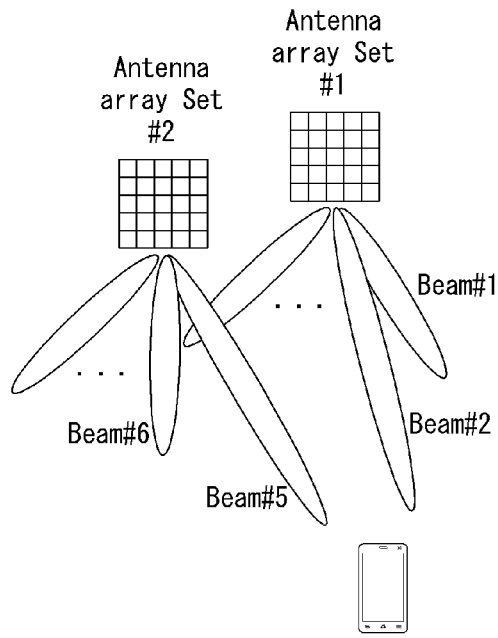
(a)
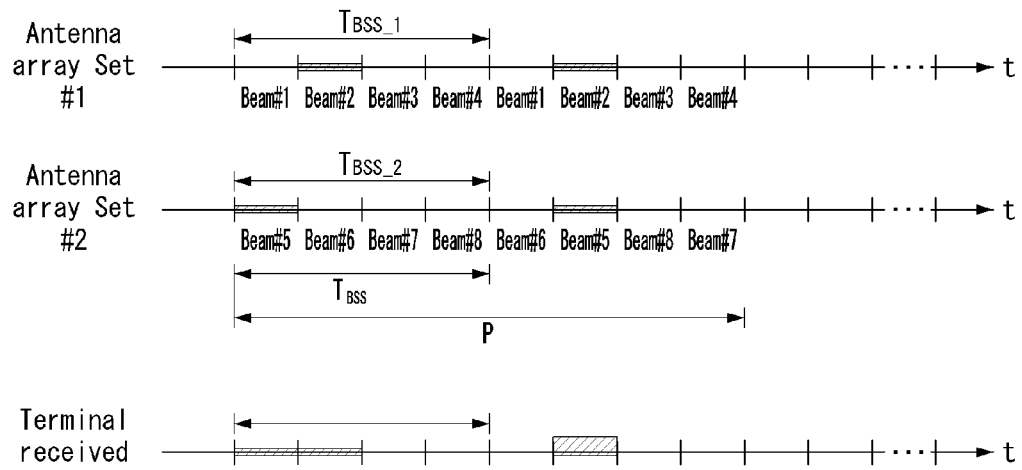
(b)

[FIG. 20]
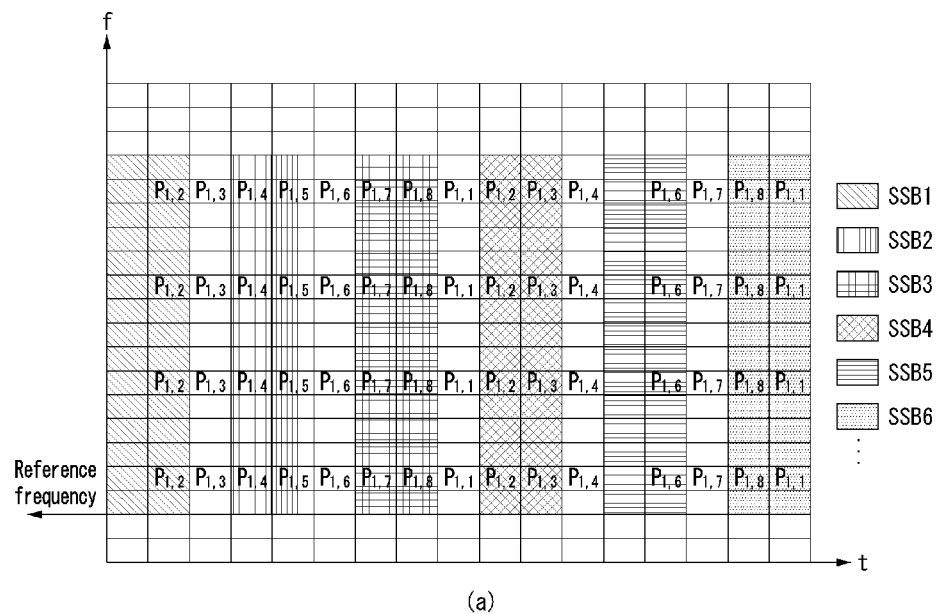
(a)
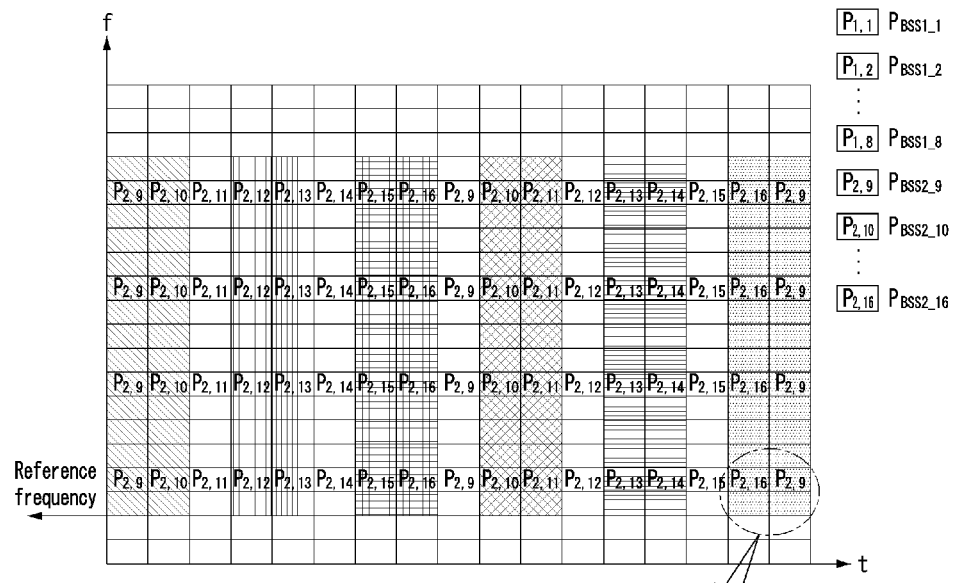
(b)
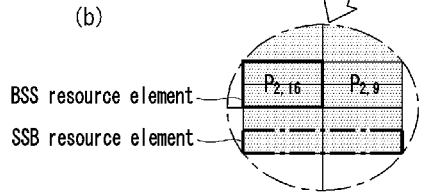

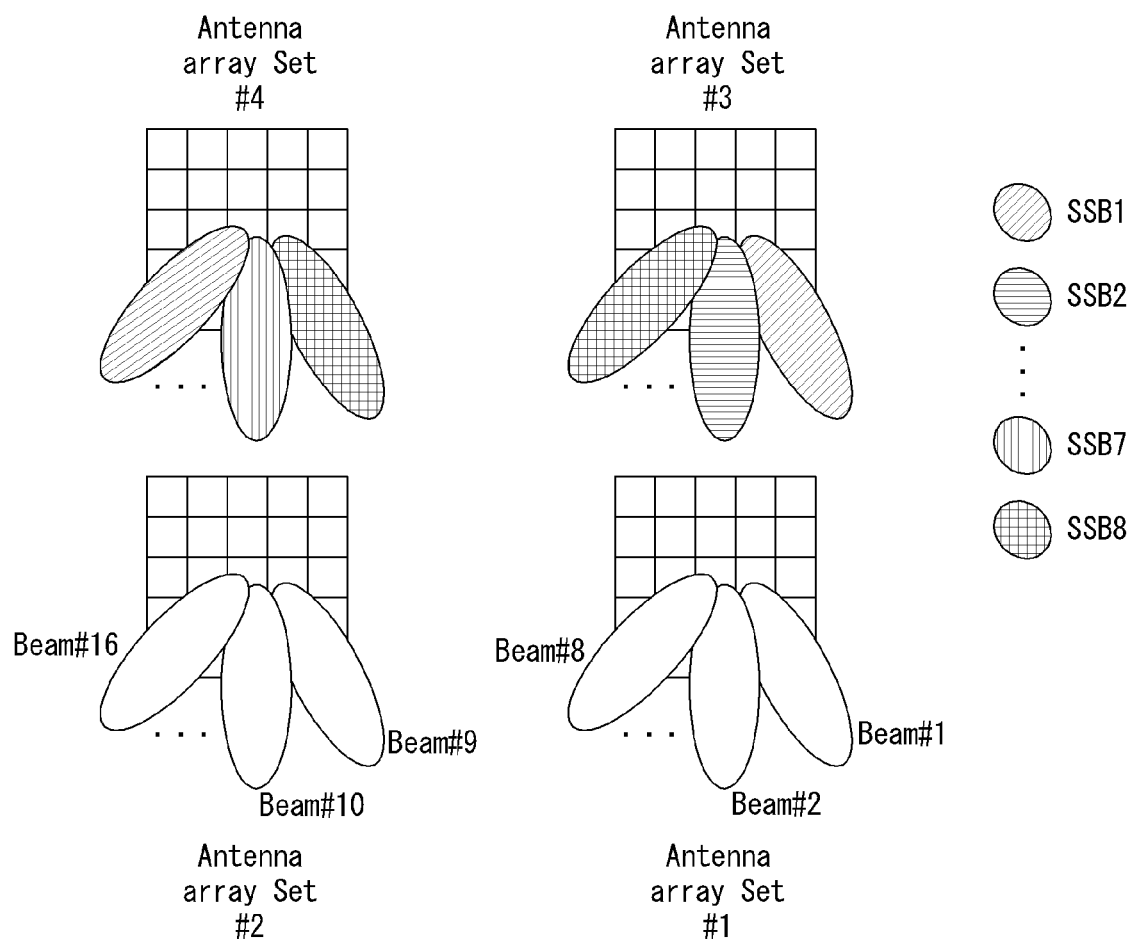
[FIG. 21]

[FIG. 22]
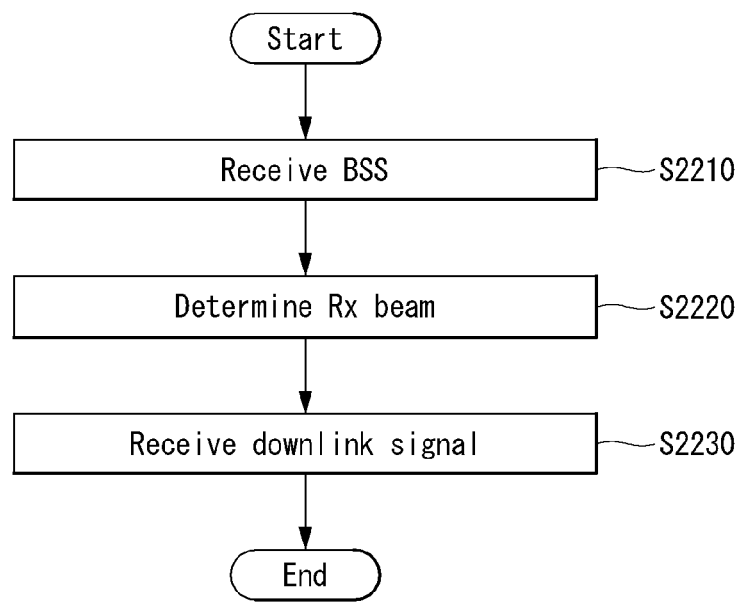

[FIG. 23]
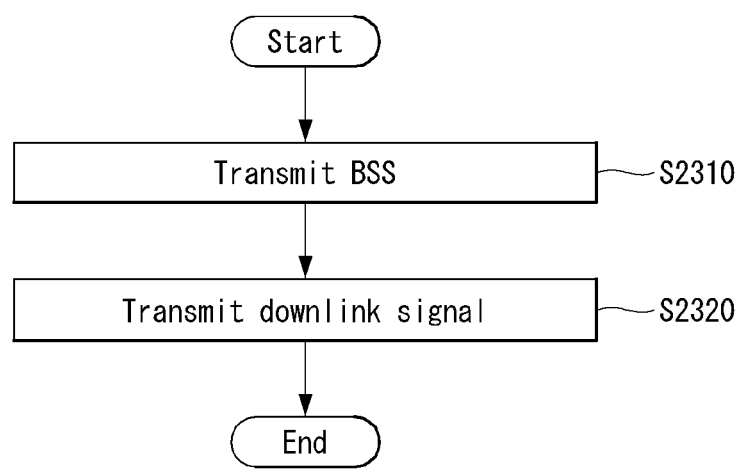

[FIG. 24]
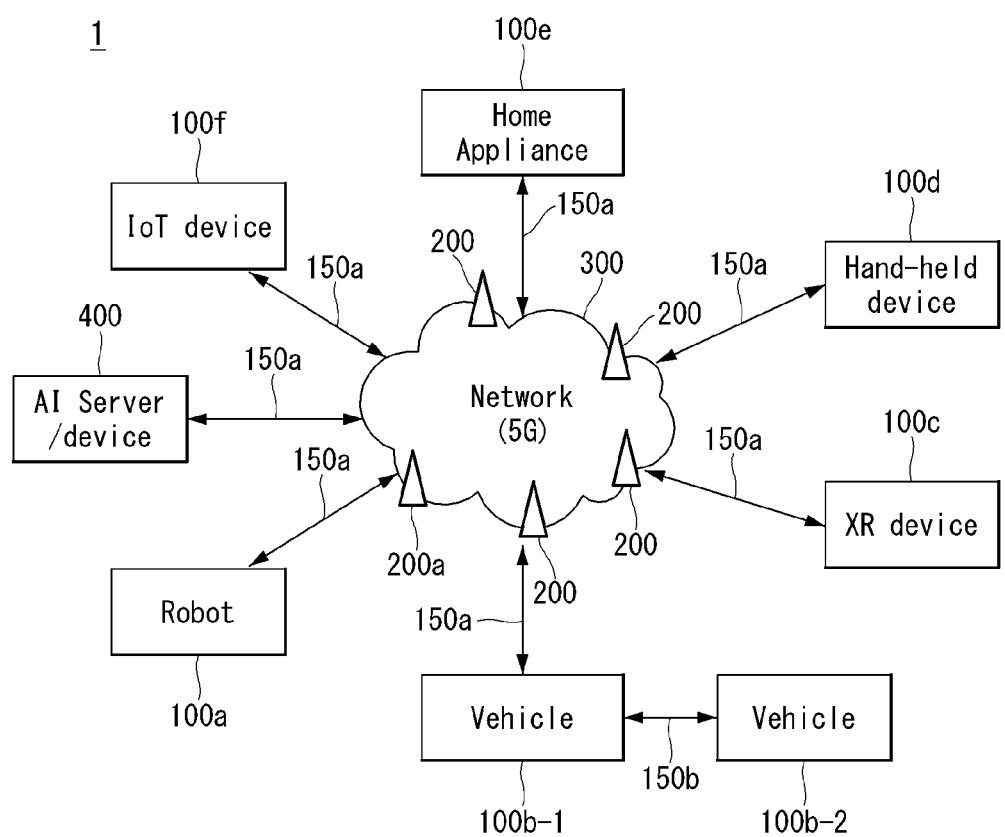

[FIG. 25]
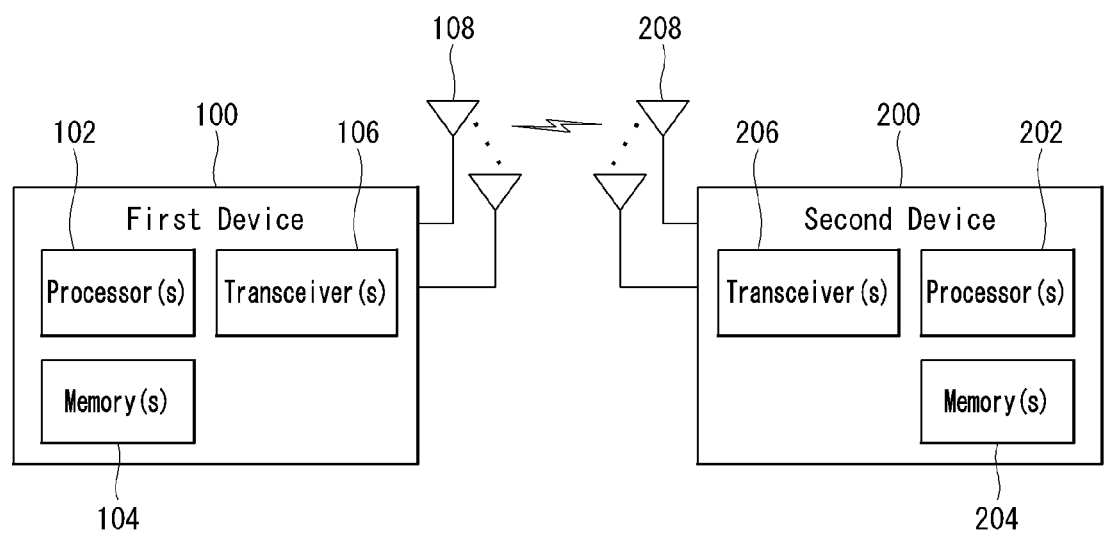

[FIG. 26]
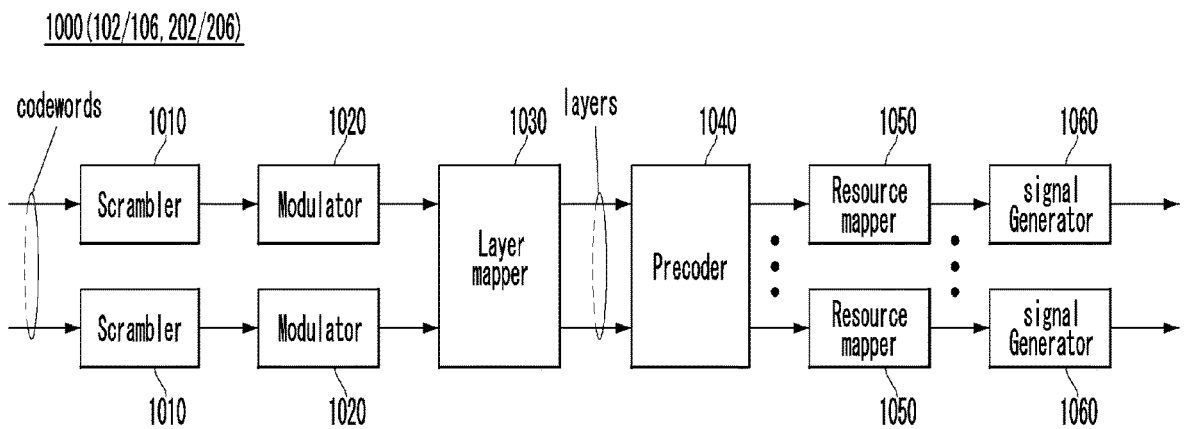

[FIG. 27]
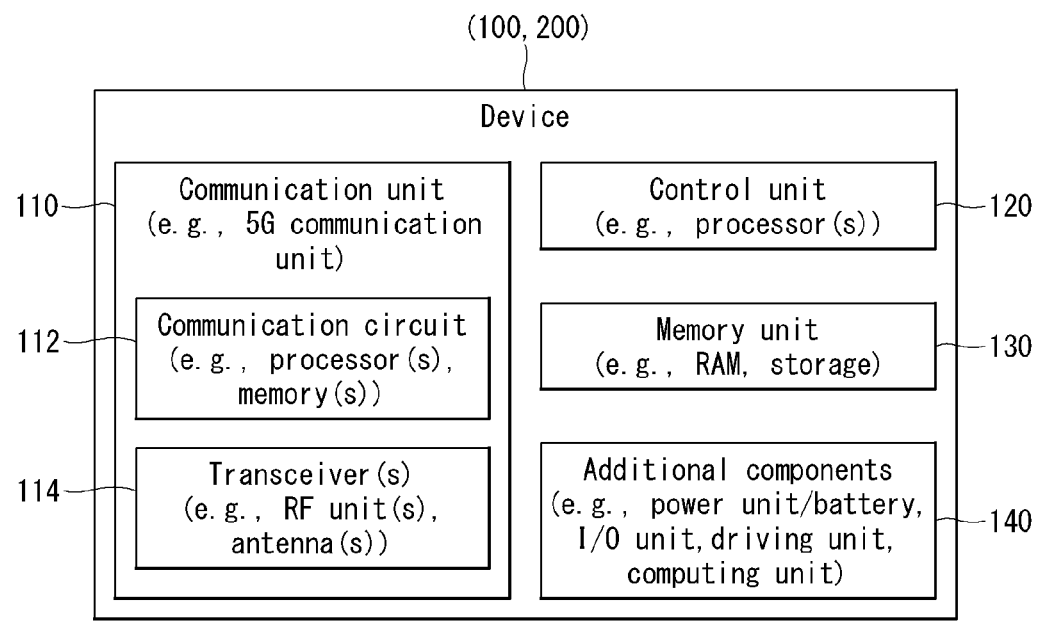

[FIG. 28]
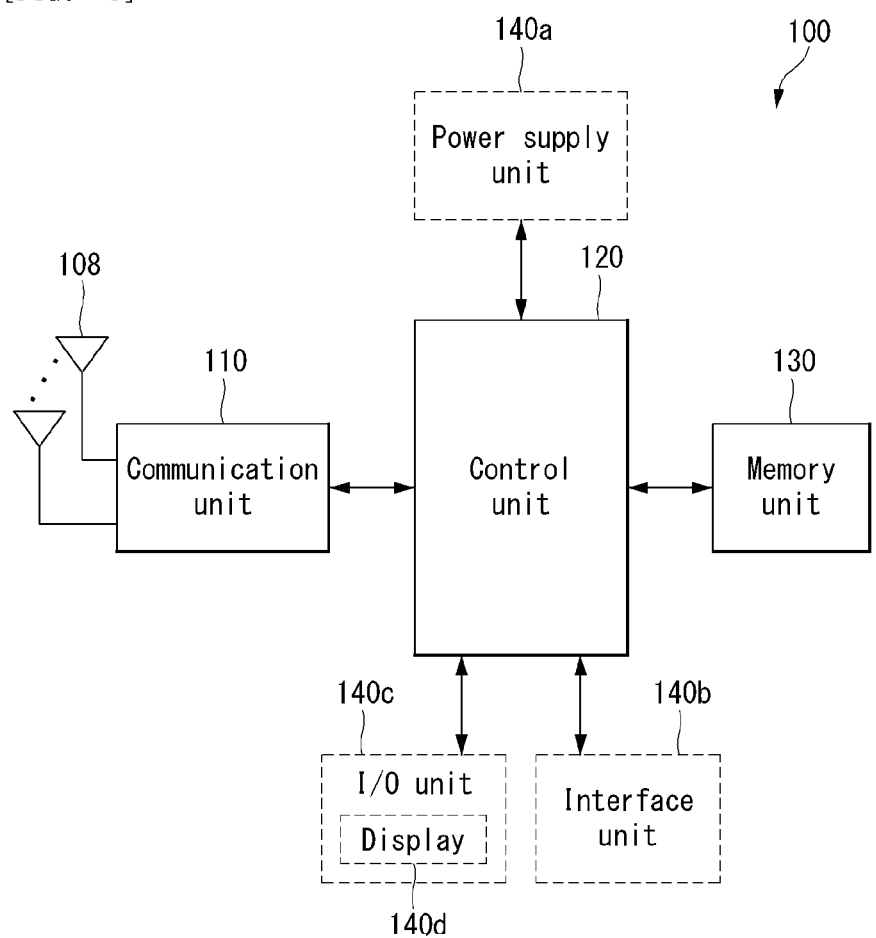

METHOD FOR TRANSMITTING AND RECEIVING SIGNAL FOR BEAM SEARCH IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2020/013086, filed on Sep. 25, 2020, the contents of which are all hereby incorporated by reference herein in their entirety.

TECHNICAL FIELD

The present disclosure relates to a method for transmitting and receiving a signal for a beam search in a wireless communication system, and an apparatus therefor.

BACKGROUND

A mobile communication system was developed to provide a voice service while ensuring the activity of a user. However, the area of the mobile communication system has extended up to data services in addition to voice. Due to a current explosive increase in traffic, there is a shortage of resources. Accordingly, there is a need for a more advanced mobile communication system because users demand higher speed services.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), the support of a super wideband, and device networking, are researched.

SUMMARY

The present disclosure provides a method for transmitting and receiving a signal for a beam search.

Extreme pathloss is expected in the terahertz (THz) band, and in order to overcome this, a terminal and a base station should use a very sharp beam. The use of the sharp beam means that the terminal and the base station must perform beam control along with beamforming, and the number of beams used is very large. Therefore, it takes a very long time to align transmission/reception beams between the base station and the terminal. In addition, when the beam alignment between the base station and the terminal is distorted due to movement or movement of the terminal, time for re-aligning the beam is frequently required, which may cause a link to become unstable.

The beam alignment method according to the conventional system (e.g., 5G system (NR)) has limitations in using the beam alignment method in the THz band when considering the number of beams used and the expected beam alignment time.

The present disclosure proposes a method for solving the above-described problem.

The technical objects of the present disclosure are not limited to the aforementioned technical objects, and other technical objects, which are not mentioned above, will be apparently appreciated by a person having ordinary skill in the art from the following description.

In an aspect, provided is a method for receiving, by a terminal, a signal for beam search in a wireless communication system, which includes: receiving a beam search signal (BSS); determining a reception beam (Rx beam) based on the BSS; and receiving a downlink signal based on the Rx beam.

The BSS is transmitted based on a specific port that is different from a port related to the transmission of the downlink signal, and the BSS is transmitted based on at least one antenna array configured dedicated for the specific port from among a plurality of antenna arrays.

The specific port may include a plurality of BSS ports related to a beam for the transmission of the BSS, and the Rx beam may be related to any one BSS port among the plurality of BSS ports.

A length of a time interval in which the BSS is transmitted based on one BSS port may be $2^k$ times of one symbol length related to the transmission of the downlink signal, and k may be an integer.

The BSS may be transmitted based on a beam sweeping, and the beam sweeping may be based on a preconfigured period.

The beam sweeping may be performed based on a change of the BSS port based on a specific pattern.

The plurality of BSS ports may be configured in time intervals according to the preconfigured period based on a specific order, the specific order may be changed at each preconfigured period based on the specific pattern, and the specific pattern may be repeated at each preconfigured pattern period.

A frequency region in which the BSS is transmitted may be configured based on a reference frequency, the reference frequency may be related to a synchronization raster or a channel raster, and a numerology related to the frequency region may be determined based on a synchronization signal block (SSB) or the downlink signal.

Based on the BSS and a specific downlink signal being transmitted in same time and frequency resources, the transmission of the BSS based on a specific BSS port among the plurality of BSS ports may be performed based on a preconfigured priority. When the transmission of the BSS is related to a synchronization, the transmission of the BSS may have a highest priority. When the transmission of the BSS is not related to the synchronization and the specific BSS port is related to the beam for the transmission of the specific downlink signal, the transmission of the BSS may be omitted.

An automatic frequency control (AFC) related to the reception of the downlink signal may be performed based on a frequency offset estimated from the BSS.

An automatic gain control (AGC) related to the reception of the downlink signal may be performed based on a transmission power of the BSS.

The BSS and the downlink signal may be received through different time and frequency resources.

In another aspect, provided is a terminal for receiving a signal for a beam search in a wireless communication system, which includes: one or more transceivers; one or more processors controlling one or more transceivers; and one or more memories operably connectable to the one or more processors, and storing instructions of performing operations when executed by the one or more processors.

The operations include receiving a beam search signal (BSS), determining a reception beam (Rx beam) based on the BSS, and receiving a downlink signal based on the Rx beam.

The BSS is transmitted based on a specific port that is different from a port related to the transmission of the downlink signal, and the BSS is transmitted based on at least one antenna array configured dedicated for the specific port from among a plurality of antenna arrays.

The BSS and the downlink signal may be transmitted in same time and frequency resources.

In yet another aspect, provided is an apparatus which includes: one or more memories; and one or more processors functionally connected to one or more memories. The one or more processors are configured to control the apparatus to receive a beam search signal (BSS), determine a reception beam (Rx beam) based on the BSS, and receive a downlink signal based on the Rx beam.

The BSS is transmitted based on a specific port that is different from a port related to the transmission of the downlink signal, and the BSS is transmitted based on at least one antenna array configured dedicated for the specific port from among a plurality of antenna arrays.

In still yet another aspect, provided are one or more non-transitory computer-readable media storing one or more instructions. One or more instructions executable by one or more processors are configured to control a terminal to receive a beam search signal (BSS), determine a reception beam (Rx beam) based on the BSS, and receive a downlink signal based on the Rx beam.

The BSS is transmitted based on a specific port that is different from a port related to the transmission of the downlink signal, and the BSS is transmitted based on at least one antenna array configured dedicated for the specific port from among a plurality of antenna arrays.

In still yet another aspect, provided is a method for transmitting, by a base station, a signal for a beam search in a wireless communication system, which includes: transmitting a beam search signal (BSS); and transmitting a downlink signal.

The BSS is transmitted based on a specific port that is different from a port related to the transmission of the downlink signal, and the BSS is transmitted based on at least one antenna array configured dedicated for the specific port from among a plurality of antenna arrays.

In still yet another aspect, provided is a base station for transmitting a signal for a beam search in a wireless communication system, which includes: one or more transceivers; one or more processors controlling one or more transceivers; and one or more memories operably connectable to the one or more processors, and storing instructions of performing operations when executed by the one or more processors.

The operations include transmitting a beam search signal (BSS), and transmitting a downlink signal.

The BSS is transmitted based on a specific port that is different from a port related to the transmission of the downlink signal, and the BSS is transmitted based on at least one antenna array configured dedicated for the specific port from among a plurality of antenna arrays.

When a signal (e.g., SSB) for conventional beam management is transmitted, another downlink signal/channel cannot be transmitted in a time/frequency resource in which the corresponding signal is transmitted. Conversely, the signal for the beam management cannot be transmitted in the time/frequency resource in which another downlink signal/channel is transmitted.

In this regard, according to an embodiment of the present disclosure, a beam search signal (BSS) is transmitted based on a specific port different from a conventional downlink signal/channel (e.g., PDSCH), and the BSS is transmitted based on at least one antenna array configured dedicated for the specific port among a plurality of antenna arrays. That is, the transmission of the BSS can be performed regardless of the time/frequency resource region in which another downlink signal/channel is transmitted. Accordingly, downlink resource utilization can be improved while minimizing the time required for beam management procedures (beam search, beam tracking) in the terahertz (THz) band.

In the terahertz band, a large subcarrier interval is set, resulting in a short symbol length, which also shortens the length of a Cyclic Prefix (CP). In this case, signal distortion due to beam switching lowers the accuracy of signal processing for beam search.

In this regard, according to an embodiment of the present disclosure, the specific port includes a plurality of BSS ports related to a beam for the transmission of the BSS. In this case, the length of the time interval in which the BSS based on one BSS port is transmitted can be $2^k$ times of one symbol length related to transmission of the downlink signal, and k can be an integer. That is, since the BSS based on one BSS port is transmitted within a time interval longer than the symbol length, signal processing accuracy of the BSS can be enhanced.

When BSSs based on different BSS ports are transmitted in the same time region through a plurality of antenna arrays, in estimating the beam of the BSS previously received by the terminal, it may be unclear on which BSS port among the plurality of BSS ports the corresponding beam is transmitted.

In this regard, according to an embodiment of the present disclosure, the BSS is transmitted based on beam sweeping, and the beam sweeping is based on a preconfigured period. The beam sweeping is performed based on a change of the BSS port based on a specific pattern, and the plurality of BSS ports are configured in time intervals according to the preconfigured period based on a specific order. The specific order is changed at each preconfigured period based on the specific pattern. As described above, since the BSS port order related to transmission of the BSS is changed for each beam sweeping period, the reception power of the terminal is measured differently from that of the previous beam sweeping period. Accordingly, the terminal can more accurately estimate which BSS port the measured beam is related to among a plurality of BSS ports.

Effects which may be obtained from the present disclosure are not limited by the above effects, and other effects that have not been mentioned may be clearly understood from the above description by those skilled in the art to which the present disclosure pertains.

BRIEF DESCRIPTION OF THE DRAWINGS

FIG. 1 illustrates physical channels and general signal transmission used in a 3GPP system.

FIG. 2 is a view showing an example of a communication structure providable in a 6G system applicable to the present disclosure.

FIG. 3 illustrates a structure of a perceptron to which the method proposed in the present disclosure can be applied.

FIG. 4 illustrates the structure of a multilayer perceptron to which the method proposed in the present disclosure can be applied.

FIG. 5 illustrates a structure of a deep neural network to which the method proposed in the present disclosure can be applied.

FIG. 6 illustrates the structure of a convolutional neural network to which the method proposed in the present disclosure can be applied.

FIG. 7 illustrates a filter operation in a convolutional neural network to which the method proposed in the present disclosure can be applied.

FIG. 8 illustrates a neural network structure in which a circular loop to which the method proposed in the present disclosure can be applied.

FIG. 9 illustrates an operation structure of a recurrent neural network to which the method proposed in the present disclosure can be applied.

FIG. 10 is a view showing an electromagnetic spectrum applicable to the present disclosure.

FIG. 11 is a view showing a THz communication method applicable to the present disclosure.

FIG. 12 is a view showing a THz wireless communication transceiver applicable to the present disclosure.

FIG. 13 is a view showing a THz signal generation method applicable to the present disclosure.

FIG. 14 is a view showing a wireless communication transceiver applicable to the present disclosure.

FIG. 15 is a view showing a transmitter structure based on a photonic source applicable to the present disclosure.

FIG. 16 is a view showing an optical modulator structure applicable to the present disclosure.

FIG. 17 is a view for describing a relationship between an antenna array set and a BSS port according to an embodiment of the present disclosure.

FIG. 18 is a view for describing a period and an offset related to a BSS according to an embodiment of the present disclosure.

FIG. 19 is a view for describing an operation in which a terminal measures the BSS according to an embodiment of the present disclosure.

FIG. 20 illustrates a resource allocated for transmission of the BSS according to an embodiment of the present disclosure.

FIG. 21 illustrates antenna array sets allocated for transmission of the BSS and transmission of an SSB according to an embodiment of the present disclosure.

FIG. 22 is a flowchart for describing a method for receiving, by a terminal, a signal for a beam search in a wireless communication system according to an embodiment of the present disclosure.

FIG. 23 is a flowchart for describing a method for receiving, by a base station, a signal for a beam search in a wireless communication system according to another embodiment of the present disclosure.

FIG. 24 illustrates a communication system 1 applied to the present disclosure.

FIG. 25 illustrates wireless devices applicable to the present disclosure.

FIG. 26 illustrates a signal process circuit for a transmission signal applied to the present disclosure.

FIG. 27 illustrates another example of a wireless device applied to the present disclosure.

FIG. 28 illustrates a hand-held device applied to the present disclosure.

DETAILED DESCRIPTION

Hereinafter, embodiments disclosed in the present disclosure will be described in detail with reference to the accompanying drawings, but the same or similar components are denoted by the same and similar reference numerals, and redundant descriptions thereof will be omitted. The suffixes "module" and "unit" for components used in the following description are given or used interchangeably in consideration of only the ease of preparation of the specification, and do not have meanings or roles that are distinguished from each other by themselves. In addition, in describing the embodiments disclosed in the present disclosure, when it is determined that a detailed description of related known technologies may obscure the subject matter of the embodiments disclosed in the present disclosure, the detailed description thereof will be omitted. In addition, the accompanying drawings are for easy understanding of the embodiments disclosed in the present disclosure, and the technical idea disclosed in the present disclosure is not limited by the accompanying drawings, and all modifications included in the spirit and scope of the present disclosure. It should be understood to include equivalents or substitutes.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA).

UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

For clarity, the description is based on a 3GPP communication system (eg, LTE, NR, etc.), but the technical idea of the present disclosure is not limited thereto. LTE refers to the technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to the technology after TS 38.xxx Release 15. 3GPP 6G may mean technology after TS Release 17 and/or Release 18. "xxx" means standard document detail number. LTE/NR/6G may be collectively referred to as a 3GPP system. Background art, terms, abbreviations, and the like used in the description of the present disclosure may refer to matters described in standard documents published before the present disclosure. For example, you can refer to the following document:

3GPP LTE
36.211: Physical channels and modulation
36.212: Multiplexing and channel coding
36.213: Physical layer procedures
36.300: Overall description
36.331: Radio Resource Control (RRC)

3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification Physical Channel and Frame Structure
Physical Channels and General Signal Transmission FIG. 1 illustrates physical channels and general signal transmission used in a 3GPP system. In a wireless communication system, a terminal receives information from a base station through a downlink (DL), and the terminal transmits information to the base station through an uplink (UL). The information transmitted and received by the base station and the terminal includes data and various control information, and various physical channels exist according to the type/use of information transmitted and received by them.

When the terminal is powered on or newly enters a cell, the terminal performs an initial cell search operation such as synchronizing with the base station (S101). To this end, the UE receives a Primary Synchronization Signal (PSS) and a Secondary Synchronization Signal (SSS) from the base station to synchronize with the base station and obtain information such as cell ID. Thereafter, the terminal may receive a physical broadcast channel (PBCH) from the base station to obtain intra-cell broadcast information. Meanwhile, the UE may receive a downlink reference signal (DL RS) in the initial cell search step to check a downlink channel state.

After completing the initial cell search, the UE receives a physical downlink control channel (PDCCH) and a physical downlink shared channel (PDSCH) according to the information carried on the PDCCH, thereby receiving a more specific system Information can be obtained (S102).

On the other hand, when accessing the base station for the first time or when there is no radio resource for signal transmission, the terminal may perform a random access procedure (RACH) for the base station (S103 to S106). To this end, the UE transmits a specific sequence as a preamble through a physical random access channel (PRACH) (S103 and S105), and a response message to the preamble through a PDCCH and a corresponding PDSCH (RAR (Random Access Response) message) In the case of contention-based RACH, a contention resolution procedure may be additionally performed (S106).

After performing the above-described procedure, the UE receives PDCCH/PDSCH (S107) and physical uplink shared channel (PUSCH)/physical uplink control channel as a general uplink/downlink signal transmission procedure. (Physical Uplink Control Channel; PUCCH) transmission (S108) can be performed. In particular, the terminal may receive downlink control information (DCI) through the PDCCH. Here, the DCI includes control information such as resource allocation information for the terminal, and different formats may be applied according to the purpose of use.

On the other hand, control information transmitted by the terminal to the base station through uplink or received by the terminal from the base station is a downlink/uplink ACK/NACK signal, a channel quality indicator (CQI), a precoding matrix index (PMI), and (Rank Indicator) may be included. The terminal may transmit control information such as CQI/PMI/RI described above through PUSCH and/or PUCCH.

Structure of Uplink and Downlink Channels
Downlink Channel Structure

The base station transmits a related signal to the terminal through a downlink channel to be described later, and the terminal receives a related signal from the base station through a downlink channel to be described later.

(1) Physical Downlink Shared Channel (PDSCH)

PDSCH carries downlink data (eg, DL-shared channel transport block, DL-SCH TB), and includes Quadrature Phase Shift Keying (QPSK), Quadrature Amplitude Modulation (QAM), 64 QAM, 256 QAM, etc. The modulation method is applied. A codeword is generated by encoding TB. The PDSCH can carry multiple codewords. Scrambling and modulation mapping are performed for each codeword, and modulation symbols generated from each codeword are mapped to one or more layers (Layer mapping). Each layer is mapped to a resource together with a demodulation reference signal (DMRS) to generate an OFDM symbol signal, and is transmitted through a corresponding antenna port.

(2) Physical Downlink Control Channel (PDCCH)

The PDCCH carries downlink control information (DCI) and a QPSK modulation method is applied. One PDCCH is composed of 1, 2, 4, 8, 16 Control Channel Elements (CCEs) according to the Aggregation Level (AL). One CCE consists of 6 REGs (Resource Element Group). One REG is defined by one OFDM symbol and one (P)RB.

The UE acquires DCI transmitted through the PDCCH by performing decoding (aka, blind decoding) on the set of PDCCH candidates. The set of PDCCH candidates decoded by the UE is defined as a PDCCH search space set. The search space set may be a common search space or a UE-specific search space. The UE may acquire DCI by monitoring PDCCH candidates in one or more search space sets set by MIB or higher layer signaling.

Uplink Channel Structure

The terminal transmits a related signal to the base station through an uplink channel to be described later, and the base station receives a related signal from the terminal through an uplink channel to be described later.

(1) Physical Uplink Shared Channel (PUSCH)

PUSCH carries uplink data (eg, UL-shared channel transport block, UL-SCH TB) and/or uplink control information (UCI), and CP-OFDM (Cyclic Prefix-Orthogonal Frequency Division Multiplexing) waveform (waveform), DFT-s-OFDM (Discrete Fourier Transform-spread-Orthogonal Frequency Division Multiplexing) is transmitted based on the waveform. When the PUSCH is transmitted based on the DFT-s-OFDM waveform, the UE transmits the PUSCH by applying transform precoding. For example, when transform precoding is not possible (eg, transform precoding is disabled), the UE transmits a PUSCH based on the CP-OFDM waveform, and when transform precoding is possible (eg, transform precoding is enabled), the UE is CP-OFDM. PUSCH may be transmitted based on a waveform or a DFT-s-OFDM waveform. PUSCH transmission is dynamically scheduled by the UL grant in the DCI or is semi-static based on higher layer (e.g., RRC) signaling (and/or Layer 1 (L1) signaling (e.g., PDCCH)). Can be scheduled (configured grant). PUSCH transmission may be performed based on a codebook or a non-codebook.

(2) Physical Uplink Control Channel (PUCCH)

The PUCCH carries uplink control information, HARQ-ACK, and/or scheduling request (SR), and may be divided into a plurality of PUCCHs according to the PUCCH transmission length.

6G System General

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 1 below. That is, Table 1 shows the requirements of the 6G system.

TABLE 1

| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

FIG. 2 is a view showing an example of a communication structure providable in a 6G system applicable to the present disclosure.

Referring to FIG. 2, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

FIG. 3 illustrates a structure of a perceptron to which the method proposed in the present disclosure can be applied.

Referring to FIG. 3, when an input vector x=(x1, x2, . . . , xd) is input, each component is multiplied by a weight (W1, W2, . . . , Wd), and all the results are summed. After that, the entire process of applying the activation function σ(•) is called a perceptron. The huge artificial neural network structure may extend the simplified perceptron structure shown in FIG. 3 to apply input vectors to different multidimensional perceptrons. For convenience of explanation, an input value or an output value is referred to as a node.

Meanwhile, the perceptron structure illustrated in FIG. 3 may be described as being composed of a total of three layers based on an input value and an output value. An artificial neural network in which H (d+1) dimensional perceptrons exist between the 1st layer and the 2nd layer, and K (H+1) dimensional perceptrons exist between the 2nd layer and the 3rd layer, as shown in FIG. 4.

FIG. 4 illustrates the structure of a multilayer perceptron to which the method proposed in the present disclosure can be applied.

The layer where the input vector is located is called an input layer, the layer where the final output value is located is called the output layer, and all layers located between the input layer and the output layer are called a hidden layer. In the example of FIG. 4, three layers are disclosed, but since the number of layers of the artificial neural network is counted excluding the input layer, it can be viewed as a total of two layers. The artificial neural network is constructed by connecting the perceptrons of the basic blocks in two dimensions.

The above-described input layer, hidden layer, and output layer can be jointly applied in various artificial neural network structures such as CNN and RNN to be described later as well as multilayer perceptrons. The greater the number of hidden layers, the deeper the artificial neural network is, and the machine learning paradigm that uses the deep enough artificial neural network as a learning model is called Deep Learning. In addition, the artificial neural network used for deep learning is called a deep neural network (DNN).

FIG. 5 illustrates a structure of a deep neural network to which the method proposed in the present disclosure can be applied.

The deep neural network shown in FIG. 5 is a multilayer perceptron composed of eight hidden layers+output layers. The multilayer perceptron structure is expressed as a fully-connected neural network. In a fully connected neural network, a connection relationship does not exist between nodes located on the same layer, and a connection relationship exists only between nodes located on adjacent layers. DNN has a fully connected neural network structure and is composed of a combination of multiple hidden layers and activation functions, so it can be usefully applied to understand the correlation characteristics between input and output. Here, the correlation characteristic may mean a joint probability of input/output.

On the other hand, depending on how the plurality of perceptrons are connected to each other, various artificial neural network structures different from the aforementioned DNN can be formed.

In a DNN, nodes located inside one layer are arranged in a one-dimensional vertical direction. However, in FIG. 6, it may be assumed that w nodes are arranged in two dimensions, and h nodes are arranged in a two-dimensional manner (convolutional neural network structure of FIG. 6). In this case, since a weight is added per connection in the connection process from one input node to the hidden layer, a total of h×w weights must be considered. Since there are h×w nodes in the input layer, a total of h2w2 weights are required between two adjacent layers.

FIG. 6 illustrates the structure of a convolutional neural network to which the method proposed in the present disclosure can be applied.

The convolutional neural network of FIG. 6 has a problem in that the number of weights increases exponentially according to the number of connections, so instead of considering the connection of all modes between adjacent layers, it is assumed that a filter having a small size exists. Thus, as shown in FIG. 7, weighted sum and activation function calculations are performed on a portion where the filters overlap.

One filter has a weight corresponding to the number as much as the size, and learning of the weight may be performed so that a certain feature on an image can be extracted and output as a factor. In FIG. 7, a filter having a size of 3×3 is applied to the upper leftmost 3×3 area of the input layer, and an output value obtained by performing a weighted sum and activation function operation for a corresponding node is stored in z22.

While scanning the input layer, the filter performs weighted summation and activation function calculation while moving horizontally and vertically by a predetermined interval, and places the output value at the position of the current filter. This method of operation is similar to the convolution operation on images in the field of computer vision, so a deep neural network with this structure is called a convolutional neural network (CNN), and a hidden layer generated as a result of the convolution operation. Is referred to as a convolutional layer. In addition, a neural network in which a plurality of convolutional layers exists is referred to as a deep convolutional neural network (DCNN).

FIG. 7 illustrates a filter operation in a convolutional neural network to which the method proposed in the present disclosure can be applied.

In the convolutional layer, the number of weights may be reduced by calculating a weighted sum by including only nodes located in a region covered by the filter in the node where the current filter is located. Due to this, one filter can be used to focus on features for the local area. Accordingly, the CNN can be effectively applied to image data processing in which the physical distance in the 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data properties. Considering the length variability of the sequence data and the relationship between the sequence data, one element in the data sequence is input at each timestep, and the output vector (hidden vector) of the hidden layer output at a specific time point is input together with the next element in the sequence. The structure applied to the artificial neural network is called a recurrent neural network structure.

FIG. 8 illustrates a neural network structure in which a circular loop to which the method proposed in the present disclosure can be applied.

Referring to FIG. 8, a recurrent neural network (RNN) is a fully connected neural network with elements (x1(t), x2(t), . . . , xd(t)) of any line of sight t on a data sequence. In the process of inputting, the point t−1 immediately preceding is the weighted sum and activation function by inputting the hidden vectors (z1(t−1), z2(t−1), . . . , zH(t−1)) together. It is a structure to be applied. The reason for transferring the hidden vector to the next view in this way is that information in the input vector at the previous views is regarded as accumulated in the hidden vector of the current view.

FIG. 9 illustrates an operation structure of a recurrent neural network to which the method proposed in the present disclosure can be applied.

Referring to FIG. 9, the recurrent neural network operates in a predetermined order of time with respect to an input data sequence.

Hidden vectors (z1(1), z2(1), . . . , zH(1)) is input with the input vector (x1(2), x2(2), . . . , xd(2)) of the time point 2, and the vector (z1(2), z2(2), . . . , zH(2)) is determined. This process is repeatedly performed up to the time point 2, time point 3, . . . time point T.

Meanwhile, when a plurality of hidden layers are disposed in a recurrent neural network, this is referred to as a deep recurrent neural network (DRNN). The recurrent neural network is designed to be usefully applied to sequence data (for example, natural language processing).

As a neural network core used as a learning method, in addition to DNN, CNN, and RNN, Restricted Boltzmann Machine (RBM), deep belief networks (DBN), and deep Q-networks Network), and can be applied to fields such as computer vision, speech recognition, natural language processing, and voice/signal processing.

In recent years, attempts to integrate AI with a wireless communication system have appeared, but this has been concentrated in the field of wireless resource management and allocation in the application layer, network layer, in particular, deep learning. However, such research is gradually developing into the MAC layer and the physical layer, and in particular, attempts to combine deep learning with wireless transmission in the physical layer have appeared. The AI-based physical layer transmission refers to applying a signal processing and communication mechanism based on an AI driver rather than a traditional communication framework in the fundamental signal processing and communication mechanism. For example, deep learning-based channel coding and decoding, deep learning-based signal estimation and detection, deep learning-based MIMO mechanism, AI-based resource scheduling, and it may include allocation and the like.

Terahertz (THz) Communication

THz communication is applicable to the 6G system. For example, a data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high pathloss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

Terahertz (THz) Wireless Communications in General

THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

FIG. 11 is a view showing a THz communication method applicable to the present disclosure.

Referring to FIG. 11, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 2 below shows an example of technology which may be used in the THz wave.

TABLE 2

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

THz wireless communication can be classified based on a method for generating and receiving THz. The THz generation method can be classified as an optical device or an electronic device-based technology.

FIG. 12 is a view showing a THz wireless communication transceiver applicable to the present disclosure.

The method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF represents an intermediate frequency, a tripler and a multiplier represents a multiplier, PA represents a power amplifier, and LNA represents a low noise amplifier, and PLL represents a phase-locked loop.

FIG. 13 is a view showing a THz signal generation method applicable to the present disclosure and FIG. 14 is a view showing a wireless communication transceiver applicable to the present disclosure.

Referring to FIGS. 13 and 14, the optical device-based THz wireless communication technology means a method of generating and modulating a THz signal using an optical device. The optical device-based THz signal generation technology refers to a technology that generates an ultra-high-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 13, a laser diode, a broadband optical modulator, and an ultrahigh-speed photodetector are required. In the case of FIG. 13, the light signals of two lasers having different wavelengths are combined to generate a THz signal corresponding to a wavelength difference between the lasers. In FIG. 13, an optical coupler refers to a semiconductor device that transmits an electrical signal using light waves to provide coupling with electrical isolation between circuits or systems, and a unitravelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 14, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

The structure of a photoelectric converter (or photoelectric converter) will be described with reference to FIGS. 15 and 16. FIG. 15 is a view showing a transmitter structure based on a photonic source applicable to the present disclosure. FIG. 16 is a view showing an optical modulator structure applicable to the present disclosure.

generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation $10^2$ dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal nonlinearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

The aforementioned contents may be combined with subsequent embodiments proposed in the present disclosure and applied or may be supplemented to clarify technical characteristics of the embodiments proposed in the present disclosure. Hereinafter, the embodiments to be described hereinafter have been divided for convenience of description only, and some elements of any one embodiment may be substituted with some elements of another embodiment or may be mutually combined and applied.

Symbols/abbreviations/terms used in relation to embodiments of the present disclosure to be described below are as follows.

BSS: Beam Search Signal
PSS: Primary Synchronization Signal
SSS: Secondary Synchronization Signal
SSB: Synchronization Signal Block
PDCCH: physical layer downlink control channel
PDSCH: physical layer downlink control channel Hereinafter, technical problems related to the embodiments of the present disclosure to be described below will be described in detail.

The present disclosure proposes a method for solving problems related to beam alignment for using a terahertz (THz) band for wireless communication.

Extreme pathloss is expected in the terahertz (THz) band, and in order to overcome this, a terminal and a base station should use a very sharp beam. The use of the sharp beam means that the terminal and the base station must perform beam control along with beamforming, and the number of beams used is very large. Therefore, it takes a very long time to align transmission/reception beams between the base station and the terminal. In addition, when the beam alignment between the base station and the terminal is distorted due to movement or movement of the terminal, time for re-aligning the beam is frequently required, which may cause a link to become unstable.

The beam alignment method according to the conventional system (e.g., 5G system (NR)) has limitations in using the beam alignment in the THz band when considering the number of beams used and the expected beam alignment time.

A beam operation in NR is divided into 1) a beam search process in the step of finding a cell and 2) a process of tracking a beam after a link is connected. At this time, the terminal must search for the Tx beam of the base station and the Rx beam of the terminal in the two processes.

In the beam search process, beams used by the base station are provided through a Synchronization Signal Block (SSB), and up to 64 beams are provided for 5 ms. In addition, data transmission/reception of the corresponding terminal is restricted while the terminal searches for the beam. That is, data transmission/reception becomes impossible while the corresponding terminal aligns the beam.

In the process of tracking the beam, beam alignment is performed through a channel state information-reference signal (CSI-RS). At this time, the Tx beam search of the base station and the Rx beam search of the terminal operate in a time division manner.

Regarding the Tx beam search of the base station, the base station provides the beam of the corresponding base station to the terminal in a non-periodic schemer (i.e., the terminal transmits an aperiodic CSI-RS to the corresponding terminal). The terminal searches for an optimal Tx beam by measuring beams (i.e., aperiodic CSI-RS) provided from the base station. The terminal may feed back the optimal Tx beam to the base station. Based on the feedback information of the terminal, the base station may determine a beam (i.e., the optimal Tx beam) for the Rx beam search of the terminal.

Regarding the Rx beam search of the terminal, the base station provides the optimal Tx beam to the terminal in a periodic scheme (i.e., the terminal transmits periodic CSI-RS to the corresponding terminal based on the optimal Tx beam). The terminal searches for the optimal Rx beam based on the optimal Tx beam (i.e., periodic CSI-RS). At this time, the number of beams that can be provided is limited to a maximum of 128, and the base station may repeatedly transmit the same Tx beam (the periodic CSI-RS) with a period of at least 1 ms or longer.

As described above, in the THz band, sharp beams must be used to overcome severe pathloss, and accordingly, the number of beams used (searched) by the base station (or terminal) is expected to be significantly greater than the number of the number of beams provided in the conventional system (e.g., 5G NR).

A comparison of the number of antenna arrays required in terms of pathloss is as follows. The pathloss of the 300 GHz band is greater than that of the 28 GHz band by approximately 21 dB. This means that in an ideal situation, 128 times more antenna arrays are required than in the conventional system. Even if it is assumed that both the terminal and the base station increase the size of the antenna array, since the beam width is reduced more than the 28 GHz band, the number of beams must also increase proportionally to cover the same area based on the beam width. As a result, when beam search is performed according to the conventional method in the terahertz band, it takes a lot of time.

The present disclosure proposes a beam search signal (BSS) as a method for overcoming the above-mentioned problems and proposes a beam operation method using the same.

1) BSS (Beam Search Signal)

Hereinafter, a beam search signal (BSS) for the terminal to perform a fast beam search will be defined, and a method for providing the BSS by the base station and an operation of the terminal will be described.

An operation of the terminal/base station according to the conventional beam search method is performed as follows. The base station provides a beam (e.g., SSB or CSI-RS in NR) by utilizing resources defined in the time and frequency regions, and the terminal measures a signal received in the corresponding resource. Based on this operation, the Tx beam of the base station and the Rx beam of the terminal are searched. In order to measure the beam defined according to the conventional method, the terminal needs to monitor a specific frequency region at regular time intervals. The monitoring resources (time and frequency resources) are mutually reserved between the terminal and the base station for the beam operation, and are not used for data transmission and reception.

On the other hand, the BSS according to the embodiment of the present disclosure may be provided in the spatial region and may be transmitted based on a beam sweeping to provide all beams.

Since the BSS is provided in the spatial region, time and frequency resources through which the BSS is transmitted may be used for transmission of various conventional channels and signals (e.g., PDCCH, PDSCH, SSB, or CSI-RS).

There is a separate unique port (hereinafter referred to as $P_{BSS}$ for transmitting BSS, and the corresponding port is used separately from the conventional channel/or signal. $P_{BSS}$ may be set in multiple numbers.

$P_{BSS}$ may be based on a virtual antenna port or a physical antenna set.

The virtual antenna port is a logical antenna port defined as a logical concept. A plurality of virtual antenna ports may be configured based on a plurality of antennas. That is, a plurality of virtual antenna ports may be related (mapped) to the plurality of antennas. For example, the virtual antenna port may correspond to a (arbitrary) layer related to a Multi Input Multi Output (MIMO) operation.

The physical antenna set means an (arbitrary) set constituted by antenna elements constituting the antenna. The antenna set may be configured based on an array for performing beamforming.

Embodiments described below assume that the physical antenna array set is used, but this is for convenience of description and application of the embodiments according to the present disclosure is not limited to operations based on the physical antenna array set.

When a total of N beams are transmitted based on M physical antenna array sets, the BSS port at this time may be expressed as $P_{BSSm\_n}$. Here, m∈{1, 2, ... M}, n∈{1, 2, ... N}. For example, $P_{BSS1\_3}$ indicates transmission of beam #3 in antenna array set #1. Since the BSS is provided in the spatial region, $P_{BSSm\_n}$ and $P_{BSSm'\_n'}$ (m≠m') may be transmitted in the same time and frequency resource. In this case, the BSS is transmitted based on two beams (n and n') in a space.

A plurality of physical antenna array sets may exist in one antenna panel, or conversely, one physical antenna array set may be implemented through several panels. Physical antenna array sets may be centralized and concentrated and arranged in one place (one location) or distributed and arranged. Accordingly, a situation in which the BSS is transmitted based on a Coordinated Multi-Point (CoMP) operation may also be considered.

FIG. 17 is a view for describing a relationship between an antenna array set and a BSS port according to an embodiment of the present disclosure. Specifically, FIG. 17 illustrates the relationship between a physical antenna array set, a BSS beam, and a BSS port. $P_{BSS1\_1}$ and $P_{BSSm\_n}$ may be transmitted in the same time and frequency resources in the space.

A time interval in which (the BSS based on) one BSS port is transmitted may be different from a symbol length in which various channels (or signals) are transmitted. For example, a time resolution for transmitting the BSS may be defined/set in units of $2^k$ times (k is an integer) a symbol length through which various channels (or signals) are transmitted. If k=0, a beam switching interval of the BSS is equal to the symbol length of various channels (or signals).

The beam of the BSS may be provided periodically (i.e., the BSS may be transmitted periodically). The same or different BSS beam periods may be set for each physical antenna array set. Information related to sweeping of all beams (e.g., N beams) of the BSS may be provided to the terminal. BSS beam sweeping-related information may include information ($Offset_{BSS}$, $T_{BSS}$) about a start time point and time interval of beam sweeping related to the BSS. $T_{BSS}$ $T_{BSS}$ represents a sweeping period related to BSS transmission. $Offset_{BSS}$ indicates a start time of the BSS transmission from a reference time within a frame (e.g., subframe). The reference time may be based on a frame start time or a start time of a SSB beam period (e.g., 5 ms). However, it is not limited thereto, and the reference time may be set to a different time depending on the implementation of the terminal and the base station.

The following methods may be considered in relation to $T_{BSS}$ and $Offset_{BSS}$ provided to the terminal.

When the maximum value of $T_{BSS}$ among each BSS beam period of the physical antenna array set is $T_{BSS\_max}$ and the start point of this time is $Offset_{BSS\_max}$, $T_{BSS}$ and $Offset_{BSS}$ may be set according to the following 1) or 2).

$$T_{BSS} \geq T_{BSS\_max}, Offset_{BSS} = Offset_{BSS\_max} = Offset_{BSS\_i} \quad 1)$$

The setting of $T_{BSS}$ and $Offset_{BSS}$ according to 1) above is for separately operating the transmission of the BSS and the physical antenna array set. The setting corresponds to the example shown in FIG. 18A.

$$T_{BSS} = T_{BSS\_i} = T_{BSS\_max},$$
$$Offset_{BSS} = Offset_{BSS\_max} = Offset_{BSS\_i} \quad 2)$$

The setting of $T_{BSS}$ and $Offset_{BSS}$ according to 2) above is for integrally operating the physical antenna array set related to the BSS transmission. The setting corresponds to the example shown in FIG. 18B.

Here, $T_{BSS\_i}$ denotes the BSS beam sweeping period $T_{BSS}$ of the i-th physical antenna array set, and $Offset_{BSS\_i}$ denotes $Offset_{BSS}$ of the i-th physical antenna array set.

FIG. 18 is a view for describing a period and an offset related to a BSS according to an embodiment of the present disclosure. Specifically, FIG. 18 illustrates the concept of $T_{BSS}$ and $Offset_{BSS}$ when a plurality of physical antenna array sets exist. In FIG. 18, k=1, that is, the time resolution for transmitting the BSS is $2^1$ times the symbol length through which the conventional channels (or signals) are transmitted. Also, the reference time is the start time of the frame.

The order of BSS ports of beams provided from an arbitrary antenna array set may be changed based on a specific pattern every period (permutation based on specific pattern). This will be described in detail with reference to FIG. 19 below.

FIG. 19 is a view for describing an operation in which a terminal measures the BSS according to an embodiment of the present disclosure.

FIG. 19A illustrates an operation of the terminal measuring the beam from the antenna array set according to an embodiment of the present disclosure. FIG. 19B is a graph showing a reception power of the terminal when the beam is measured according to an embodiment of the present disclosure.

In FIG. 19A, two antenna array sets provide beam #1 to beam #8. The terminal of FIG. 19A becomes an environment in which signals of beam #2 and beam #5 are measured among beams provided from each array set.

FIG. 19B shows beams in the time region provided from each of the antenna array sets and the resulting terminal received power. The port of Antenna Array Set #2 is changed based on a specific pattern every period (i.e., $T_{BSS}$). In other words, the order in which the ports of antenna array set #2 are arranged in the time region may be changed every period. At this time, P means a period in which the same pattern appears again.

By changing the port as described above, the terminal may more accurately estimate the index of the corresponding beam port from the beams provided by the plurality of antenna array sets. When a terminal receives BSS transmitted through the same BSS port based on a fixed Rx beam within a period according to period P, the size of the terminal received power is measured differently according to the permutation type (i.e., the order of BSS ports that differ for each $T_{BSS}$). Using this, the terminal may estimate the beam (BSS port) of the received BSS. Hereinafter, a case in which the order of BSS ports is not changed and a case in which the order is changed will be compared and described in detail.

Referring to FIG. 19A, the beams provided to the terminal are beam #2 and beam #5.

Referring to FIG. 19B, in the first period, antenna array set #1 provides beam #2 in the second time interval (e.g., the second OFDM symbol) within the interval according to the corresponding period $T_{BSS\_1}$, and antenna array set #2 provides beam #5 in the first time interval (e.g., first OFDM symbol) within the interval according to the corresponding period $T_{BSS\_2}$. The terminal measures the BSS transmitted by the antenna array sets #1 and #2. Beams (i.e., BSS based on beam #2 and beam #5) provided by the corresponding antenna array sets are measured in the first and second regions (e.g., first and second symbols) in the time region according to the first period (terminal received power).

At this time, when the BSS is transmitted in the next period without changing the order of the BSS ports, it becomes difficult for the terminal to accurately estimate the BSS port. Specifically, the BSS according to the first period was measured in the first region and the second region within the interval according to the corresponding period, and since it is impossible to estimate how much each component of the beam #1 and beam #5 out of the reception power measured in the first region from the side of the corresponding terminal and how much each component of the beam #2 and beam #6 out of the reception power measured in the second region is, it is impossible to accurately distinguish the BSS port.

According to an embodiment of the present disclosure, a BSS port pattern related to at least one antenna array set #2 among the plurality of antenna array sets #1 and #2 may be changed for each beam sweeping period $T_{BSS}$. The change of the BSS port pattern is based on a specific pattern, and the specific pattern is repeated based on a preconfigured period P.

In the second period, the BSS port order of antenna array set #2 is changed as follows. [#5 #6 #7 #8→#6 #5 #8 #7]

In the second period, the BSS is transmitted based on the same beams #2 and #5, but in terms of terminal received power, the corresponding BSS is measured only in the second area within the interval according to the second period. Accordingly, the terminal may estimate that the BSS is transmitted by beams #2 and #5, as well as infer the reception power according to each beam. That is, if the measured reception powers in the two regions measured in the first period are P1,1 and P1,2, respectively, and the measured reception powers in the two regions measured in the second period are P2,1 and P2,2, respectively, $P\ \#1 + P\ \#5 = P1,1$ $P\ \#2 + P\ \#6 = P1,2$ $P\ \#1 + P\ \#6 = P2,1$ $P\ \#2 + P\ \#5 = P2,2$ As described above, the terminal may estimate the size of the reception power of each BSS port. Here, P #1, P #2, P #5, and P #6 are the reception power magnitudes of the BSS ports, respectively.

The base station may configure/transmit information related to the order of the BSS ports to the terminal. The information related to the BSS port order may include information on at least one of the specific patterns (e.g., (#5 #6 #7 #8), (#6 #5 #8 #7)) or a period P related to the specific pattern.

BSSs in the frequency region may be arranged at regular intervals in a specific interval. That is, the BSS may be transmitted in a preconfigured frequency region, and the preconfigured frequency region may be configured based on a predetermined interval.

For example, the preconfigured frequency region may be arranged at $2^d$*subcarrier spacing at a reference frequency within a frequency resource region configured for SSB transmission (where d={1, 2, 3 . . . }).

Since the BSS configured in the preconfigured frequency region is repeatedly transmitted in the time region, the terminal may estimate a frequency offset.

In the terahertz (THz) band, a large sub-carrier space is set in response to phase noise, so that the symbol period is shortened. As a result, the Cyclic Prefix (CP) interval is also shortened, and the accuracy of signal processing using the CP is lowered due to signal distortion due to beam switching.

On the other hand, according to the above-described embodiment, more accurate signal processing may be performed within the symbol interval in which the BSS is transmitted. The terminal may perform an automatic frequency control (AFC) in beam tracking and search intervals using the BSS.

When the base station simultaneously transmits the BSS and another channel in the same beam direction (same space), interference between the two signals may occur (i.e., interference occurs when the other channel and the BSS are transmitted based on the same beam and the same time/frequency resource). In this case, the base station may omit the transmission of the BSS according to predefined priorities. At this time, the omission of the BSS transmission may be omitted when the BSS and SSB operate as separate functions. In order to prevent ambiguity in the AFC operation of the terminal (e.g., when the BSS is used for the AFC operation and transmission of the corresponding BSS is omitted, it is unclear which signal to perform the AFC operation based on), the base station may provide omission related to information of the BSS to the terminal. In this case, the terminal may perform the AFC operation based on a signal other than the BSS. For example, it may be assumed that the BSS and the DMRS are transmitted in the same space (transmitted based on the same beam) at an arbitrary moment. If the priority of the BSS is lower than that of the DMRS, the base station may omit transmission of the corresponding BSS. At this time, the terminal may estimate the beam direction estimated from the BSS from the DMRS.

Unlike the above-described embodiment, transmission of channels other than the BSS may be omitted according to the priority order. Specifically, when the BSS replaces (function of) the SSB, the corresponding BSS may have the highest priority. Replacing the SSB may mean a case in which the SSB is not transmitted because not only the beam search but also the synchronization operation is performed based on the BSS. In this case, the BSS is transmitted, and another channel may be transmitted based on puncturing or rate matching for resources overlapping with the transmission of the BSS, or the transmission may be omitted.

The base station may transmit/configure BSS omission related information (e.g., information on a time resource region (symbol position) in which the transmission of the BSS is omitted) to the terminal so that the terminal normally estimates the beam even when the transmission of the BSS is omitted. For example, the base station may provide a terminal with information such as a location where transmission of the BSS overlaps transmission of another downlink channel through a control channel (e.g., PDCCH), whether a symbol overlaps with transmission of the BSS, and the like.

Similarly, a method of allocating and using the BSS to the same time and frequency resources as the SSB may be considered. At this time, the base station may transmit information about the relationship between SSB (beam direction) and BSS port (an example in Table 3 below) to the terminal. Upon receiving the corresponding information, the terminal may check whether BSS transmission is skipped. This has an advantage of being able to search and track a beam by utilizing a sync raster.

The terminal may assume that there is no BSS transmission from the base station in a partial predefined time interval (or time interval related to a specific channel/signal). This is to minimize the effect of interference that may occur in a multi-cell environment.

Information related to the configuration of the BSS, such as the BSS beam sweeping period $T_{BSS}$, the start position $Offset_{BSS}$ of the BSS beam sweeping period, and the frequency location and interval of the BSS according to the above-described embodiment may be systematically defined. The base station may transmit information related to the configuration of the BSS to the terminal.

Hereinafter, transmission of the BSS in consideration of transmission of the SSB in FIGS. 20 and 21 will be described in detail.

FIG. 20 illustrates a resource allocated for transmission of the BSS according to an embodiment of the present disclosure. FIG. 21 illustrates antenna array sets allocated for transmission of the BSS and transmission of an SSB according to an embodiment of the present disclosure.

Referring to FIG. 20, BSS resources are allocated in consideration of the SSB transmission. Here, the configuration for the BSS is as follows.

k=−1, the time resolution for transmitting BSS is ½ (=2$^{-1}$) times the symbol length through which existing channels (or signals) are transmitted.

d=2, the frequency region in which the BSS is transmitted has a subcarrier spacing of 2$^2$ times the reference frequency of the frequency resource region configured for SSB transmission.

M=2, there are a total of two physical antenna array sets.

N=16, two physical antenna array sets transmit a total of 16 beams.

It is assumed that the SSB is transmitted through physical antenna sets different from the BSS, and the structure is shown in FIG. 21. It is assumed that a total of four antenna array sets are used, and the base station transmits the SSB through antenna array sets #3 and #4 among them and the BSS through the remaining antenna array sets #1 and #2. At this time, an example of the beam relationship between the SSB and the BSS is shown in Table 3 below.

That is, SSB1 means (a beam of) the SSB transmitted in the same direction as $P_{BSS1\_1}$ and $P_{BSS2\_16}$, and SSB2 means (a beam of) the SSB transmitted in the same direction as $P_{BSS1\_2}$ and $P_{BSS2\_15}$.

When the beam of the SSB and the beam of the BSS are the same (i.e., the directions of the beams are the same), the transmission of the corresponding BSS may be omitted. Specifically, referring to FIG. 20A, transmission of a BSS ($P_{BSS1\_1}$) transmitted in the same direction as SSB1 in the first symbol is omitted. Also, in the 13th symbol, transmission of BSS ($P_{BSS1\_5}$) transmitted in the same direction as SSB5 is omitted.

| SSB index | BSS port in physical antenna set #1 | BSS port in physical antenna set #2 |
| --- | --- | --- |
| SSB1 | $P_{BSS1\_1}$ | $P_{BSS2\_16}$ |
| SSB2 | $P_{BSS1\_2}$ | $P_{BSS2\_15}$ |
| SSB3 | $P_{BSS1\_3}$ | $P_{BSS2\_14}$ |
| SSB4 | $P_{BSS1\_4}$ | $P_{BSS2\_13}$ |
| SSB5 | $P_{BSS1\_5}$ | $P_{BSS2\_12}$ |
| SSB6 | $P_{BSS1\_6}$ | $P_{BSS2\_11}$ |
| SSB7 | $P_{BSS1\_7}$ | $P_{BSS2\_10}$ |
| SSB8 | $P_{BSS1\_8}$ | $P_{BSS2\_9}$ |

In the configuration of the SSB and BSS beams, the SSB beam and the BSS beam (BSS port) may not be matched one-to-one, as in the example of Table 3 above. For example, both the BSS ports related to the beams of SSB1 and SSB2 may be configured to $P_{BSS\_1}$. This means that the width of the BSS beam $P_{BSS1\_1}$ is large enough to cover both the beam areas of SSB1 and SSB2. Also, the number of antenna array sets for transmitting the BSS and the number of antenna array sets for transmitting another channel or signal may be different.

The ratio of the reception power of the BSS and the reception power of another channel (or signal, for example, DMRS) measured by the terminal is determined according to a transmission power ratio between the BSS and another channel and ii) a beam gain related to the transmission of the BSS and another channel.

That is, if the terminal may know the transmission power ratio and the beam gain ratio between the BSS and another channel, the terminal may adjust the gain of the RF unit (transceiver) when receiving another channel based on the magnitude of the received BSS signal. When the terminal receives the BSS, the base station may transmit information about transmission power of other channels related to transmission power of the corresponding BSS. For example, the base station provides the UE with a transmission power ratio $R_{BSS\_DMRS}$ considering the beam gains of the BSS and the DMRS, and the UE uses $R_{BSS\_DMRS}$ in the step of estimating the Rx beam to infer the size of the Rx beam of the DMRS.

The information related to the transmission power of the BSS may include information on at least one of the transmission power of the BSS, a difference between the transmission power of another channel and the transmission power of the BSS, a transmission beam gain difference between the BSS and another channel, or a transmission power ratio considering a beam gain between the BSS and another channel (a difference in transmission power between the BSS and another channel+a difference in transmission beam gain between the BSS and another channel). The base station may transmit information related to the transmission power of the BSS to the terminal.

Based on the information related to the transmit power of the BSS, the terminal may operate as in the following example.

<Embodiment> It may be assumed that the transmit power ratio $R_{BSS\_DMRS}$ of the BSS to the DMRS is 6 dB (that is, the transmit power of the BSS is greater than the transmit power of the DMRS by 6 dB), and that the PDSCH and the DMRS are transmitted in the same method. In this case, the terminal may assume that the reception power of the PDSCH is smaller than the reception power of the BSS by 6 dB. Based on the $R_{BSS\_DMRS}$, the terminal performs the automatic gain control (AGC) on the RF unit (transceiver) for receiving the PDSCH.

The information related to the BSS according to the embodiment described above may be configured for each BSS port or for each BSS port group. BSS port groups may be classified according to beam types as follows.
  Wide Beam group
  Sharp beam group
  Same physical antenna array set transmission group
  Power ratio group of the same BSS
  Using the BSS, the terminal may perform the following operations.
  Rx beam search and tracking
  Tx beam search and tracking
  System timing synchronization acquisition
  System frequency offset correction Here, when the terminal acquires system timing synchronization, signal functions such as PSS, SSS, or SSB may be included in the signal configuration of the BSS.

Hereinafter, specific operations of the terminal/base station related to the BSS will be described.

2) Transmission and Reception Procedures According to Beam Search Signal (BSS)

Regarding the cell search procedure, the base station and the terminal may operate as follows.
  The base station transmits the BSS along with the existing synchronization signals (e.g., PSS, SSS) to the terminal according to the above-described setting information (e.g., $T_{BSS}$, $Offset_{BSS}$, time resolution (k), subcarrier spacing (d), etc.).
  The terminal estimates the Rx beam (direction) from the BSS.
  In the step of estimating the Rx beam, $T_{BSS}$ (beam sweeping period) may be utilized. For example, the UE may switch the Rx beam direction in units of $T_{BSS}$.
  The terminal performs a cell search procedure by receiving a synchronization signal based on the estimated Rx beam (direction).
  The terminal acquires the acquired cell-based information (e.g., frame start time, information related to BSS transmission).
  The terminal calculates the power of the received BSS port signal and reports the received BSS port information to the base station.

Regarding the beam tracking procedure, the base station and the terminal may operate as follows.
  The base station transmits the BSS along with the conventional channels and signals (e.g., PDSCH, CSI-RS, DMRS, etc.).
  The terminal estimates the Rx beam (direction) from the BSS.
  At this time, if the terminal does not receive another channel, the terminal acquires Automatic Frequency Control (AFC) related information and Automatic Gain Control (AGC) related information from the BSS in the acquired Rx beam direction.
  The terminal receives another channel (PDSCH) based on the Rx beam direction acquired in the previous step.
  At this time, the terminal may control the RF unit for receiving another channel by using the acquired automatic frequency control (AFC) related information and automatic gain control (AGC) related information.
  If the UE fails to obtain AFC-related information/AGC-related information from the BSS in the previous step (e.g., skipping BSS transmission), the UE 1) acquires AFC-related information from another channel (e.g., uses CP correlation, etc.), 2) acquires AGC related information (received power level of DMRS).
  The terminal calculates the power of the BSS based on the received specific BSS port and reports the power to the base station. The specific BSS port may be related to the Rx beam.
  The base station determines a transmission beam (Tx beam) based on the specific BSS port acquired from the terminal.

The transmission beam is used for transmission of CSI-RS, DMRS, PDSCH, PDCCH, etc. for a corresponding terminal.

When the terminal has a plurality of antenna array sets and allocates one or more of them to BSS reception, the terminal may simultaneously perform an Rx beam direction estimation operation and a reception operation of another channel.

From an implementation point of view, operations of the base station/terminal according to the above-described embodiments (e.g., operations related to transmission and reception of BSS) may be processed by the devices of FIGS. 24 to 28 (e.g., the processors 102 and 202 of FIG. 25) to be described later.

In addition, the operations of the device according to the embodiment (e.g., operations related to transmission and reception of BSS) may also be stored in a memory (e.g., 104 and 204 in FIG. 25) in the form of instructions/programs (e.g., instructions, executable code) for driving at least one processor (e.g., 102 and 202 of FIG. 25).

[Hereinafter, Claims Related Contents]

Hereinafter, the above-described embodiments will be described in detail with reference to FIG. 22 in terms of the operation of the terminal. The methods described below are only distinguished for convenience of description, and it goes without saying that some components of one method may be substituted with some components of another method, or may be applied in combination with each other.

FIG. 22 is a flowchart for describing a method for receiving, by a terminal, a signal for a beam search in a wireless communication system according to an embodiment of the present disclosure.

Referring to FIG. 22, a method for receiving, by a terminal, a signal for a beam search in a wireless communication system according to an embodiment of the present disclosure includes a BSS receiving step (S2210), an Rx beam determining step (S2220), and a downlink signal receiving step (S2230).

In S2210, the terminal receives abeam search signal (BSS) from the base station.

According to an embodiment, the BSS may be transmitted based on a specific port different from a port related to the transmission of the downlink signal. The BSS may be transmitted based on at least one antenna array set dedicated for the specific port from among a plurality of antenna arrays. That is, the BSS may be transmitted separately from transmission of the conventional downlink signal/channel in the spatial region. The BSS may also be transmitted in a time/frequency resource region overlapping transmission of a conventional downlink/signal channel.

According to an embodiment, the specific port may include a plurality of BSS ports related to beams for transmission of the BSS.

According to an embodiment, the length of the time interval in which the BSS based on one BSS port is transmitted may be $2^k$ times of one symbol length related to transmission of the downlink signal, and k may be an integer.

According to an embodiment, the BSS may be transmitted based on a beam sweeping, and the beam sweeping may be based on a preconfigured period. At this time, the preconfigured period may be the above-described $T_{BSS}$.

According to an embodiment, the beam sweeping may be performed based on a change of the BSS port based on a specific pattern. The plurality of BSS ports may be configured in time intervals according to the preconfigured period based on a specific order. Taking antenna array set #2 of FIG. 19B as an example, the BSS is transmitted based on BSS port #5 (beam #5) to BSS port #8 (beam #8). When the time intervals according to the preconfigured period $T_{BSS\_2}$ are t1 to t4, the order of BSS ports in the first period $T_{BSS\_2}$ may be #5, #6, #7, and #8. Each BSS port according to the corresponding BSS port order may be configured at t1 to t4 (t1: #5, t2: #6, t3: #7, t4: #8).

In the next period $T_{BSS}$, the order of BSS ports may be #6, #5, #8, and #7. Each BSS port according to the corresponding BSS port order may be configured at t1 to t4 (t1: #6, t2: #5, t3: #8, t4: #7).

The specific order is changed at each preconfigured period based on the specific pattern, and the specific pattern may be repeated at each preconfigured pattern period. The preconfigured pattern period may be P in FIG. 19B.

According to an embodiment, a frequency region in which the BSS is transmitted may be configured based on a reference frequency. The reference frequency may be related to a synchronization raster or a channel raster. The synchronization raster represents the frequency location of a Synchronization Signal Block (SSB), and the channel raster represents a subset of reference frequencies that may be used to identify channel locations in uplink and downlink. A numerology related to the frequency region may be determined based on a synchronization signal block (SS block) or the downlink signal. For example, the numerology related to the frequency region is $2^{d}$*subcarrier spacing (where d={1, 2, 3 . . . }).

According to an embodiment, based on the BSS and the specific downlink signal being transmitted in the same time and frequency resources, the transmission of the BSS based on a specific BSS port among the plurality of BSS ports may be performed based on a preconfigured priority. At this time, transmission of the BSS may or may not be omitted according to the preconfigured priority. Specifically, the transmission of the BSS may be performed as follows.

1) When the transmission of the BSS is related to a synchronization, the transmission of the BSS has a highest priority (that is, the transmission of the corresponding BSS is not omitted).
2) When the transmission of the BSS is not related to the synchronization and the specific BSS port is related to the beam for the transmission of the specific downlink signal, the transmission of the BSS may be omitted.

For example, the specific downlink signal may be the SSB. When the BSS and the SSB are transmitted based on the same beam in the same time/frequency region, the transmission of the BSS may be omitted. The specific port may be determined based on preconfigured information (e.g., a beam relationship between the BSS and the SSB according to Table 3).

According to S2210 described above, the operation of the terminal (100/200 of FIGS. 24 to 28) receiving a beam search signal (BSS) from the base station (100/200 of FIGS. 24 to 28) may be implemented by the devices of FIGS. 24 to 28. For example, referring to FIG. 25, one or more processors 102 may control one or more transceivers 106 and/or one or more memories 104 to receive the beam search signal (BSS) from the base station 200.

In S2220, the UE determines an Rx beam based on the BSS.

According to an embodiment, the Rx beam may be related to any one BSS port among the plurality of BSS ports.

According to S2220 described above, the operation of the terminal (100/200 of FIGS. 24 to 28) determining the Rx beam based on the BSS may be implemented by the devices of FIGS. 24 to 28. For example, referring to FIG. 25, one or more processors 102 may control one or more transceivers 106 and/or one or more memories 104 to determine the Rx beam based on the BSS.

In S2230, the terminal receives the downlink signal based on the Rx beam from the base station.

According to an embodiment, an automatic frequency control (AFC) related to reception of the downlink signal may be performed based on a frequency offset estimated from the BSS.

According to an embodiment, an automatic gain control (AGC) related to the reception of the downlink signal may be performed based on a transmission power of the BSS.

According to an embodiment, it may be assumed that the terminal does not receive the BSS and the downlink signal in the same time/frequency resource region. Specifically, the BSS and the downlink signal may be received through different time and frequency resources.

According to S2230 described above, the operation of the terminal (100/200 of FIGS. 24 to 28) receiving the downlink signal based on the Rx beam from the base station (100/200 of FIGS. 24 to 28) may be implemented by the devices of FIGS. 24 to 28. For example, referring to FIG. 25, one or more processors 102 may control one or more transceivers 106 and/or one or more memories 104 to receive the downlink signal based on the Rx beam from the base station 200.

[Hereinafter, Base Station Claim Related Contents]

Hereinafter, the above-described embodiments will be described in detail with reference to FIG. 23 in terms of the operation of the base station. The methods described below are only distinguished for convenience of description, and it goes without saying that some components of one method may be substituted with some components of another method, or may be applied in combination with each other.

FIG. 23 is a flowchart for describing a method for receiving, by a base station, a signal for a beam search in a wireless communication system according to another embodiment of the present disclosure.

Referring to FIG. 23, a method for receiving, by a terminal, a signal for a beam search in a wireless communication system according to another embodiment of the present disclosure includes a BSS transmitting step (S2310) and a downlink signal transmitting step (S2320).

In S2310, the base station transmits abeam search signal (BSS) to the terminal.

According to an embodiment, the BSS may be transmitted based on a specific port different from a port related to the transmission of the downlink signal. The BSS may be transmitted based on at least one antenna array set dedicated for the specific port from among a plurality of antenna arrays. That is, the BSS may be transmitted separately from transmission of the conventional downlink signal/channel in the spatial region. The BSS may also be transmitted in a time/frequency resource region overlapping transmission of a conventional downlink/signal channel.

According to an embodiment, the specific port may include a plurality of BSS ports related to beams for transmission of the BSS.

According to an embodiment, the length of the time interval in which the BSS based on one BSS port is transmitted may be $2^k$ times of one symbol length related to transmission of the downlink signal, and k may be an integer.

According to an embodiment, the BSS may be transmitted based on a beam sweeping, and the beam sweeping may be based on a preconfigured period. At this time, the preconfigured period may be the above-described $T_{BSS}$.

According to an embodiment, the beam sweeping may be performed based on a change of the BSS port based on a specific pattern. The plurality of BSS ports may be configured in time intervals according to the preconfigured period based on a specific order. Taking antenna array set #2 of FIG. 19B as an example, the BSS is transmitted based on BSS port #5 (beam #5) to BSS port #8 (beam #8). When the time intervals according to the preconfigured period $T_{BSS\_2}$ are t1 to t4, the order of BSS ports in the first period $T_{BSS\_2}$ may be #5, #6, #7, and #8. Each BSS port according to the corresponding BSS port order may be configured at t1 to t4 (t1: #5, t2: #6, t3: #7, t4: #8).

In the next period $T_{BSS}$, the order of BSS ports may be #6, #5, #8, and #7. Each BSS port according to the corresponding BSS port order may be configured at t1 to t4 (t1: #6, t2: #5, t3: #8, t4: #7).

The specific order is changed at each preconfigured period based on the specific pattern, and the specific pattern may be repeated at each preconfigured pattern period. The preconfigured pattern period may be P in FIG. 19B.

According to an embodiment, a frequency region in which the BSS is transmitted may be configured based on a reference frequency. The reference frequency may be related to a synchronization raster or a channel raster. The synchronization raster represents the frequency location of a Synchronization Signal Block (SSB), and the channel raster represents a subset of reference frequencies that may be used to identify channel locations in uplink and downlink. A numerology related to the frequency region may be determined based on a synchronization signal block (SS block) or the downlink signal. For example, the numerology related to the frequency region is $2^{d}$*subcarrier spacing (where d={1, 2, 3 . . . }).

According to an embodiment, based on the BSS and the specific downlink signal being transmitted in the same time and frequency resources, the transmission of the BSS based on a specific BSS port among the plurality of BSS ports may be performed based on a preconfigured priority. At this time, transmission of the BSS may or may not be omitted according to the preconfigured priority. Specifically, the transmission of the BSS may be performed as follows.

1) When the transmission of the BSS is related to a synchronization, the transmission of the BSS has a highest priority (that is, the transmission of the corresponding BSS is not omitted).

2) When the transmission of the BSS is not related to the synchronization and the specific BSS port is related to the beam for the transmission of the specific downlink signal, the transmission of the BSS may be omitted.

For example, the specific downlink signal may be the SSB. When the BSS and the SSB are transmitted based on the same beam in the same time/frequency region, the transmission of the BSS may be omitted. The specific port may be determined based on preconfigured information (e.g., a beam relationship between the BSS and the SSB) according to Table 3).

According to S2310 described above, the operation of the base station (100/200 of FIGS. 24 to 28) transmitting the beam search signal (BSS) to the terminal (100/200 of FIGS. 24 to 28) may be implemented by the devices of FIGS. 24 to 28. For example, referring to FIG. 25, one or more processors 202 may control one or more transceivers 206 and/or one or more memories 204 to transmit the beam search signal (BSS) to the terminal 100.

In S2320, the base station transmits the downlink signal to the terminal.

The downlink signal may be transmitted based on a Tx beam determined according to information (BSS port information) acquired from the terminal. Specifically, the UE determines the Rx beam based on the BSS. The Rx beam may be related to any one BSS port among the plurality of BSS ports. The terminal may report the information on the BSS port related to the Rx beam to the base station.

According to an embodiment, an automatic frequency control (AFC) related to reception of the downlink signal may be performed based on a frequency offset estimated from the BSS. That is, the base station may configure the terminal to perform the AFC as described above.

According to an embodiment, an automatic gain control (AGC) related to the reception of the downlink signal may be performed based on a reception power of the BSS. That is, the base station may configure the terminal to perform the AGC as described above.

According to an embodiment, the BSS and the downlink signal may be transmitted in the same time and frequency resources. That is, the BSS and the downlink signal may be received at different times from the side of one terminal, but the BSS and the downlink signal may be simultaneously transmitted in the same resources from the side of the base station. This will be described in detail with reference to 1) and 2) below.

1) In the relationship between the base station and the terminal (one terminal), it may be expected that the corresponding terminal does not receive the BSS and the downlink signal in the same time/frequency resource region. That is, from the side of the terminal, the BSS and the downlink signal may be received through different time and frequency resources.

2) In the relationship between the base station and a plurality of terminals, the base station may transmit the BSS and the downlink signal in the same time and frequency resources. That is, from the side of the base station, the BSS and the downlink signal may be transmitted through the same time and frequency resources.

According to S2320 described above, the operation of the base station (100/200 of FIGS. 24 to 28) transmitting the downlink signal to the terminal (100/200 of FIGS. 24 to 28) may be implemented by the devices of FIGS. 24 to 28. For example, referring to FIG. 25, one or more processors 202 may control one or more transceivers 206 and/or one or more memories 204 to transmit the downlink signal to the terminal 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 6G) between devices.

Hereinafter, a description will be certain in more detail with reference to the drawings. In the following drawings/description, the same reference symbols may denote the same or corresponding hardware blocks, software blocks, or functional blocks unless described otherwise.

FIG. 24 illustrates a communication system 1 applied to the present disclosure.

Referring to FIG. 24, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices Applied to Present Disclosure

FIG. 25 illustrates wireless devices applicable to the present disclosure.

Referring to FIG. 25, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of a Signal Process Circuit for a Transmission Signal Applied to Present Disclosure FIG. 26 illustrates a signal process circuit for a transmission signal applied to the present disclosure.

Referring to FIG. 26, a signal processing circuit 1000 may include scramblers 1010, modulators 1020, a layer mapper 1030, a precoder 1040, resource mappers 1050, and signal generators 1060. An operation/function of FIG. 26 may be performed, without being limited to, the processors 102 and 202 and/or the transceivers 106 and 206 of FIG. 25. Hardware elements of FIG. 26 may be implemented by the processors 102 and 202 and/or the transceivers 106 and 206 of FIG. 25. For example, blocks 1010 to 1060 may be implemented by the processors 102 and 202 of FIG. 25. Alternatively, the blocks 1010 to 1050 may be implemented by the processors 102 and 202 of FIG. 25 and the block 1060 may be implemented by the transceivers 106 and 206 of FIG. 25.

Codewords may be converted into radio signals via the signal processing circuit 1000 of FIG. 26. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 26. For example, the wireless devices (e.g., 100 and 200 of FIG. 25) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of a Wireless Device Applied to Present Disclosure

FIG. 27 illustrates another example of a wireless device applied to the present disclosure. The wireless device may be implemented in various forms according to a use-case/service (refer to FIG. 24).

Referring to FIG. 27, wireless devices 100 and 200 may correspond to the wireless devices 100 and 200 of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 25. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 24), the vehicles (100b-1 and 100b-2 of FIG. 24), the XR device (100c of FIG. 24), the hand-held device (100d of FIG. 24), the home appliance (100e of FIG. 24), the IoT device (100f of FIG. 24), a digital broadcast terminal, a hologram device, a public safety device, an MTC device, a medicine device, a fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

In FIG. 27, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of a Hand-Held Device Applied to Present Disclosure

FIG. 28 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 28, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 27, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of the method for transmitting and receiving a signal for a beam search in a wireless communication system and the apparatus therefor according to the embodiments of the present disclosure are described as follows.

When a signal (e.g., SSB) for conventional beam management is transmitted, another downlink signal/channel cannot be transmitted in a time/frequency resource in which the corresponding signal is transmitted. Conversely, the signal for the beam management cannot be transmitted in the time/frequency resource in which another downlink signal/channel is transmitted.

In this regard, according to an embodiment of the present disclosure, a beam search signal (BSS) is transmitted based on a specific port different from a conventional downlink signal/channel (e.g., PDSCH), and the BSS is transmitted based on at least one antenna array configured dedicated for the specific port among a plurality of antenna arrays. That is, the transmission of the BSS can be performed regardless of the time/frequency resource region in which another downlink signal/channel is transmitted. Accordingly, downlink resource utilization can be improved while minimizing the time required for beam management procedures (beam search, beam tracking) in the terahertz (THz) band.

In the terahertz band, a large subcarrier interval is set, resulting in a short symbol length, which also shortens the length of a Cyclic Prefix (CP). In this case, signal distortion due to beam switching lowers the accuracy of signal processing for beam search.

In this regard, according to an embodiment of the present disclosure, the specific port includes a plurality of BSS ports related to a beam for the transmission of the BSS. In this case, the length of the time interval in which the BSS based on one BSS port is transmitted may be $2^k$ times (k is can be an integer) of one symbol length related to transmission of the downlink signal. That is, since the BSS based on one BSS port is transmitted within a time interval longer than the symbol length, signal processing accuracy of the BSS can be enhanced.

When BSSs based on different BSS ports are transmitted in the same time region through a plurality of antenna arrays, in estimating the beam of the BSS previously received by the terminal, it may be unclear on which BSS port among the plurality of BSS ports the corresponding beam is transmitted.

In this regard, according to an embodiment of the present disclosure, the BSS is transmitted based on a beam sweeping, and the beam sweeping is based on a preconfigured period. The beam sweeping is performed based on a change of the BSS port based on a specific pattern, and the plurality of BSS ports are configured in time intervals according to the preconfigured period based on a specific order. The specific order is changed at each preconfigured period based on the specific pattern. As described above, since the BSS port order related to transmission of the BSS is changed for each beam sweeping period, the reception power of the terminal is measured differently from that of the previous beam sweeping period. Accordingly, the terminal can more accurately estimate which BSS port the measured beam is related to among a plurality of BSS ports.

Here, wireless communication technology implemented in wireless devices (e.g, 100/200 of FIG. 25) of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally, or alternatively, the wireless communication technology implemented in the wireless devices (e.g, 100/200 of FIG. 25) of the present disclosure may perform communication based on LTE-M technology. In this case, as an example, the LTE-M technology may be an example of the LPWAN and may be called various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. Additionally, or alternatively, the wireless communication technology implemented in the wireless devices (e.g., 100/200 of FIG. 25) of the present disclosure may include at least one of ZigBee, Bluetooth, and Low Power Wide Area Network (LPWAN) considering the low-power communication, and is not limited to the name described above. As an example, the ZigBee technology may generate personal area networks (PAN) associated with small/low-power digital communication based on various standards including IEEE 802.15.4, and the like, and may be called various names.

In the aforementioned embodiments, the elements and characteristics of the present disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

What is claimed is:

1. A method, performed by a user equipment (UE), comprising:
   transmitting, to a base station, a random access preamble;
   receiving, from the base station, a random access response;
   receiving, from the base station, a reference signal;
   determining information related to downlink reception based on the reference signal; and receiving, from the base station, a downlink signal based on the information related to downlink reception,
   wherein the reference signal is transmitted, from the base station to the UE, based on a port that is different from a port related to transmission of the downlink signal,
   wherein the information related to downlink reception is based on a beam related to the reference signal,
   wherein the reference signal is transmitted, from the base station to the UE, based on each of a plurality of ports within a preconfigured period,
   wherein the reference signal is transmitted, from the base station to the UE, based on at least one antenna array dedicated for the plurality of ports from among a plurality of antenna arrays,
   wherein the transmission of the reference signal based on the specific port is omitted, based on i) the reference signal and a synchronization signal block (SSB) being transmitted, from the base station to the UE, in a same time and same frequency resources, and ii) a specific port of the plurality of ports being related to a beam for the transmission of the SSB.

2. The method of claim 1, wherein a length of a time interval in which the reference signal is transmitted based on one port is $2^k$ times of one symbol length related to the transmission of the downlink signal, and k is an integer.

3. The method of claim 1, wherein a port used for the reference signal within the preconfigured period is changed based on a specific pattern.

4. The method of claim 3, wherein the plurality of ports are configured in time intervals according to the preconfigured period based on a specific order,
   wherein the specific order is changed at each preconfigured period based on the specific pattern, and
   wherein the specific pattern is repeated at each preconfigured pattern period.

5. The method of claim 2, wherein a frequency region in which the reference signal is transmitted is configured based on a reference frequency,
   wherein the reference frequency is related to a synchronization raster or a channel raster, and
   wherein a numerology related to the frequency region is determined based on the SSB or the downlink signal.

6. The method of claim 5, wherein, for the reference signal and a DeModulation Reference Signal (DMRS) based on a same beam in a same time and same frequency resources, whether to omit the transmission of the reference signal is determined based on a preconfigured priority.

7. The method of claim 5, wherein an automatic frequency control (AFC) related to the reception of the downlink signal is performed based on a frequency offset estimated from the reference signal.

8. The method of claim 1, wherein an automatic gain control (AGC) related to the reception of the downlink signal is performed based on a transmission power of the reference signal.

9. The method of claim 1, wherein the reference signal and the downlink signal are received through different time and frequency resources.

10. A user equipment (UE) comprising:
    one or more transceivers;
    one or more processors controlling one or more transceivers; and
    one or more memories connected to the one or more processors, and storing instructions of performing operations based on being executed by the one or more processors, wherein the operations include
transmitting, to a base station, a random access preamble;
receiving, from the base station, a random access response;
receiving, from the base station, a reference signal;
determining information related to downlink reception based on the reference signal; and receiving, from the base station, a downlink signal based on the information related to downlink reception,
wherein the reference signal is transmitted, from the base station to the UE, based on a port that is different from a port related to transmission of the downlink signal,
wherein the information related to downlink reception is based on a beam related to the reference signal,
wherein the reference signal is transmitted, from the base station to the UE, based on each of a plurality of ports within a preconfigured period,
wherein the reference signal is transmitted, from the base station to the UE, based on at least one antenna array dedicated for the plurality of ports from among a plurality of antenna arrays,
wherein the transmission of the reference signal based on the specific port is omitted, based on i) the reference signal and a synchronization signal block (SSB) being transmitted, from the base station to the UE, in a same time and same frequency resources, and ii) a specific port of the plurality of ports being related to a beam for the transmission of the SSB.

11. A base station comprising:
one or more transceivers;
one or more processors controlling one or more transceivers; and
one or more memories connected to the one or more processors, and storing instructions of performing operations when executed by the one or more processors,
wherein the operations include
receiving, from a user equipment (UE), a random access preamble;
transmitting, to the UE, a random access response;
transmitting, to the UE, a reference signal; and
transmitting, to the UE, a downlink signal,
wherein information related to downlink reception by the UE is determined based on the reference signal,
wherein the reference signal is transmitted, from the base station to the UE, based on a port that is different from a port related to the transmission of the downlink signal,
wherein the information related to downlink reception is based on a beam related to the reference signal,
wherein the reference signal is transmitted, from the base station to the UE, based on each of a plurality of ports within a preconfigured period,
wherein the reference signal is transmitted, from the base station to the UE, based on at least one antenna array dedicated for the plurality of ports from among a plurality of antenna arrays,
wherein the transmission of the reference signal based on the specific port is omitted, based on i) the reference signal and a synchronization signal block (SSB) being transmitted, from the base station to the UE, in a same time and same frequency resources, and ii) a specific port of the plurality of ports being related to a beam for the transmission of the SSB.

* * * * *